United States Patent [19]

Voyer

[11] 4,352,153
[45] Sep. 28, 1982

[54] REGULATED CONVERTER WITH VOLT-BALANCING CONTROL CIRCUIT

[75] Inventor: Joseph L. Voyer, Longwood, Fla.

[73] Assignee: NCR Corporation, Dayton, Ohio

[21] Appl. No.: 242,519

[22] Filed: Mar. 11, 1981

[51] Int. Cl.³ .......................................... H02P 13/22
[52] U.S. Cl. ....................................... 363/56; 363/26; 363/80; 363/97
[58] Field of Search ...................... 363/17, 25, 26, 49, 363/56, 97, 80, 98

[56] References Cited

U.S. PATENT DOCUMENTS

| | | | |
|---|---|---|---|
| 3,859,583 | 1/1975 | Reed | 363/26 |
| 3,873,903 | 3/1975 | Koetch et al. | 363/25 |
| 4,291,366 | 9/1981 | Nelson | 363/17 |

FOREIGN PATENT DOCUMENTS

| | | | |
|---|---|---|---|
| 53-3637 | 1/1978 | Japan | 363/97 |
| 55-56472 | 4/1980 | Japan | 363/56 |

Primary Examiner—William H. Beha, Jr.
Attorney, Agent, or Firm—J. T. Cavender; Wilbert Hawk, Jr.; Richard W. Lavin

[57] ABSTRACT

A digital controller for a power supply which includes a transformer having primary and secondary windings and switching transistors for switching a current from a D.C. input means through the winding of the transformer to an output circuit. Pulse-width modulated control signals are used to control the switching operation of the transistors. In order to correct for an imbalance in the operation of the transistors, an error signal is developed which alters the value of the duty cycle of the transistors forcing the B-H curve of the transformer to oscillate between upper and lower threshold values.

15 Claims, 39 Drawing Figures

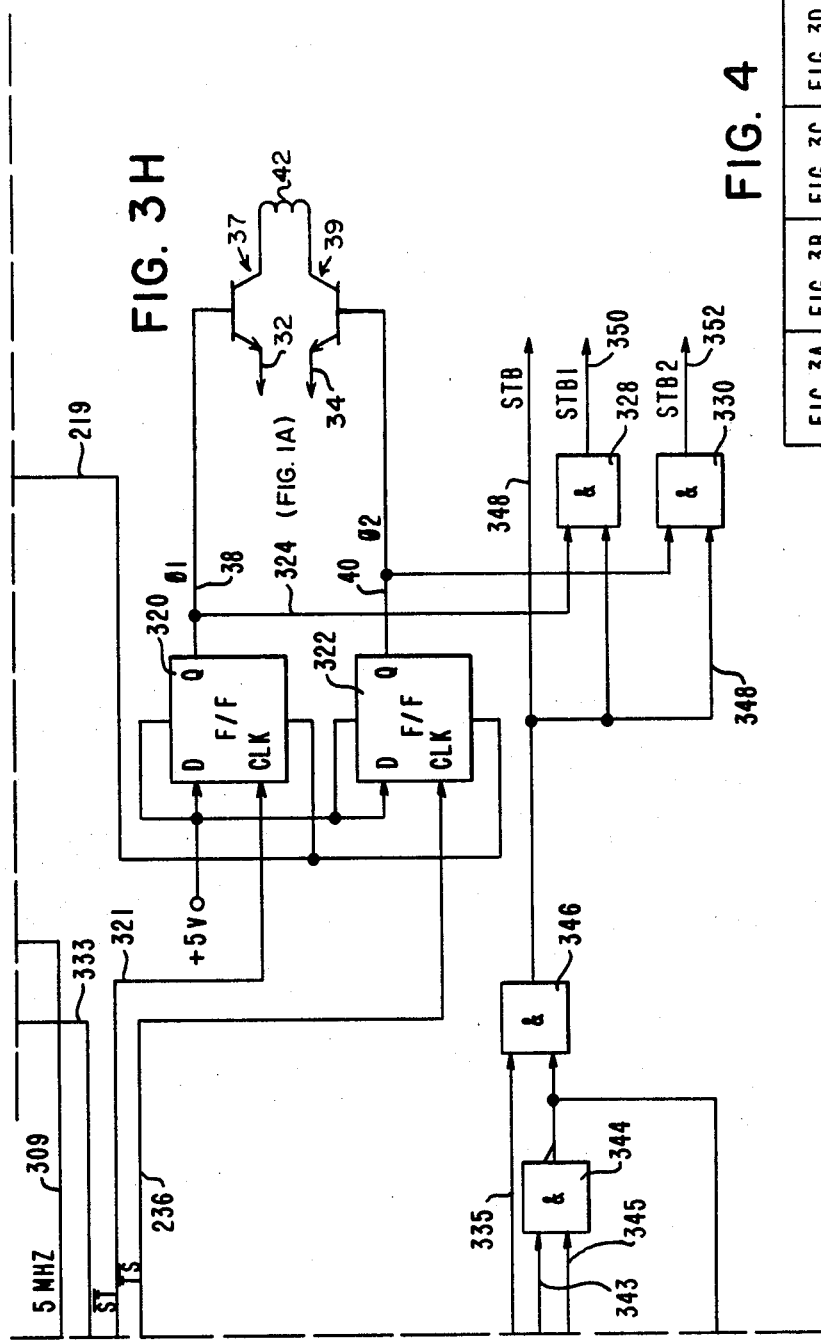

FIG. 5B
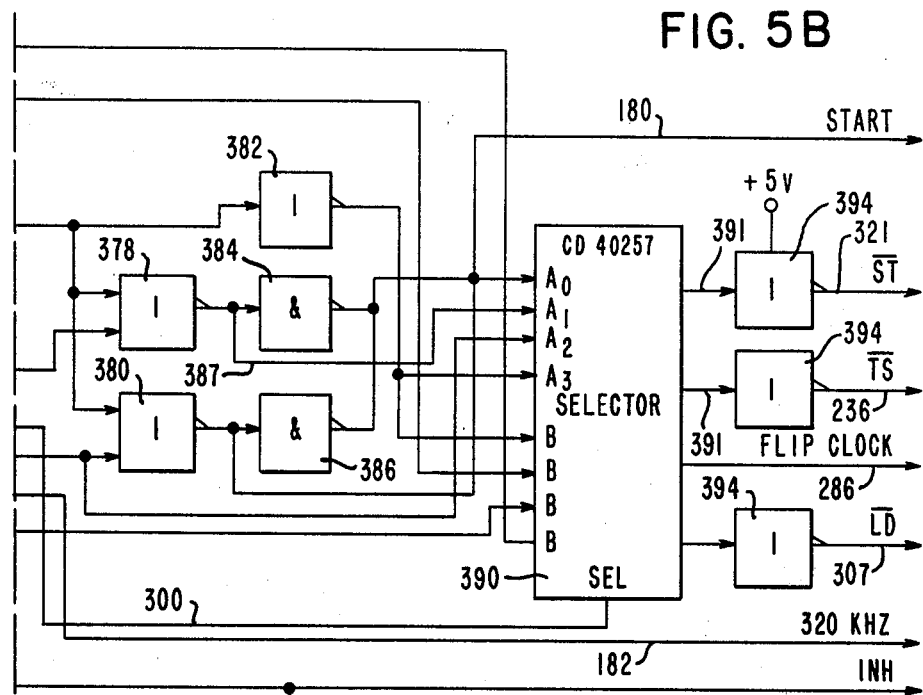
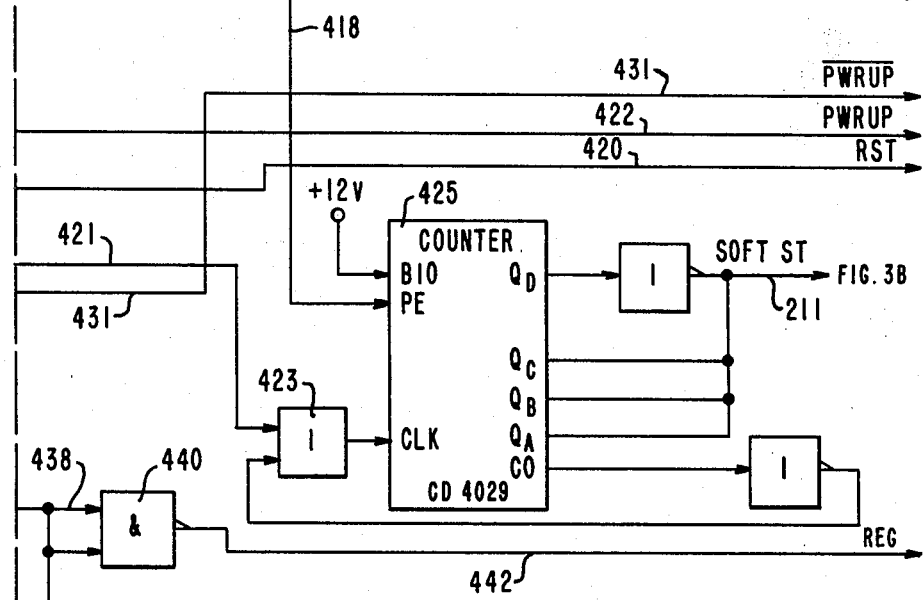
FIG. 6
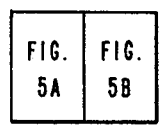

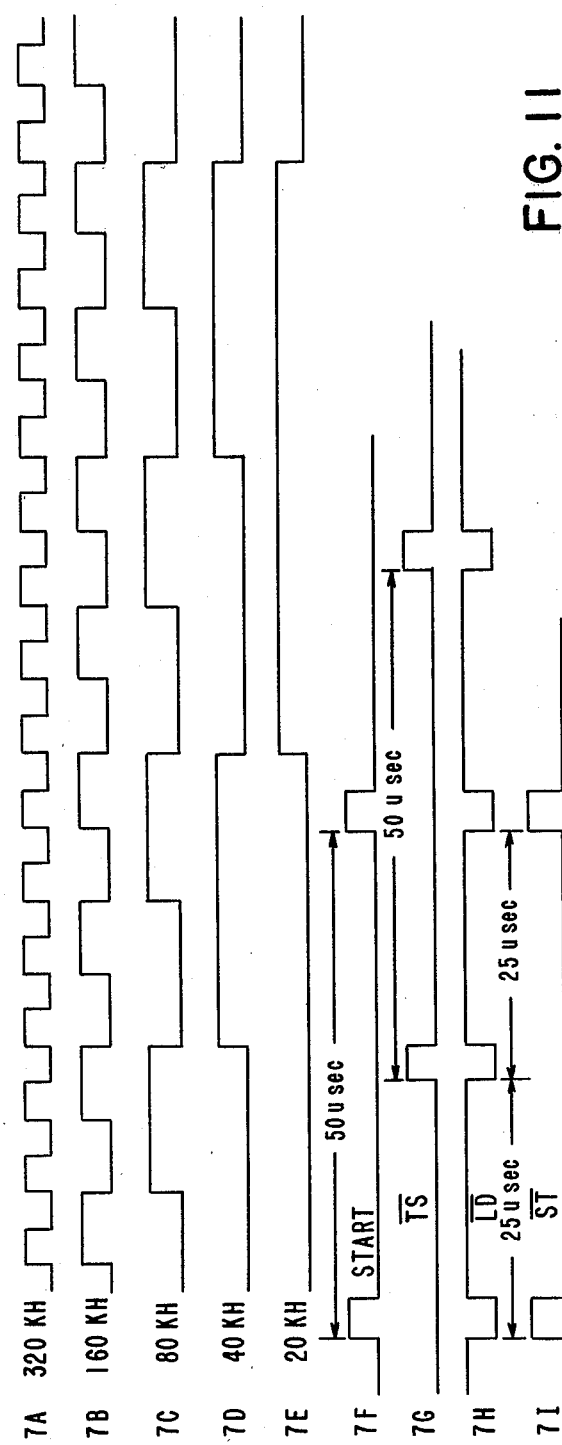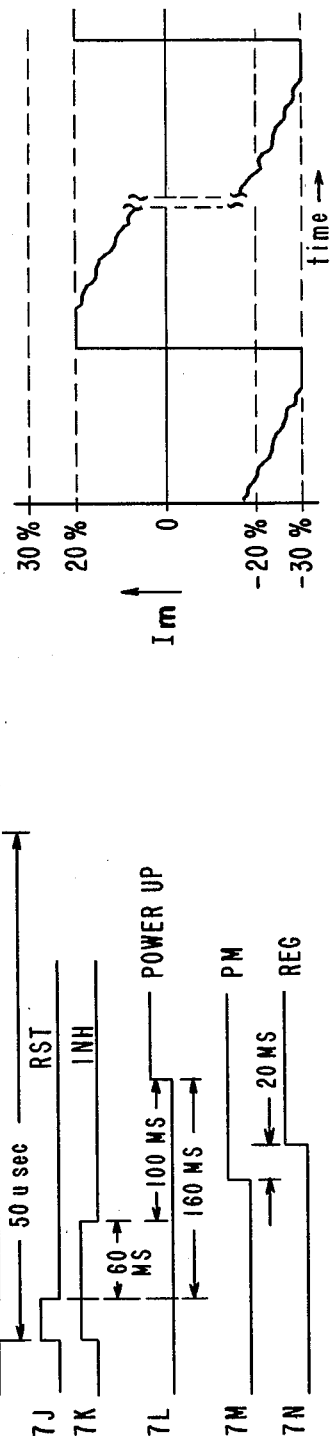

FIG. 9A $B_{S1}$ 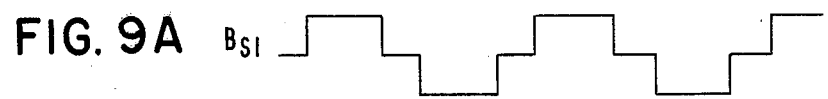
FIG. 9B $B_{S2}$ 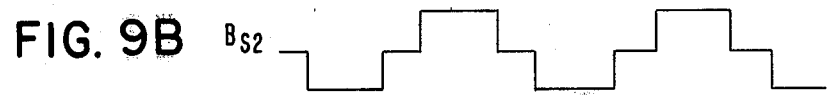
FIG. 9C $V_{b1}$ 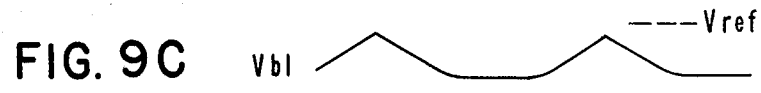 ---- Vref
FIG. 9D $V_{b2}$  ---- Vref FIG. 10A $\theta_1$ 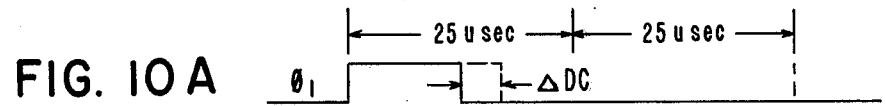
FIG. 10B $\theta_2$ 
FIG. 10C FLIP CLOCK 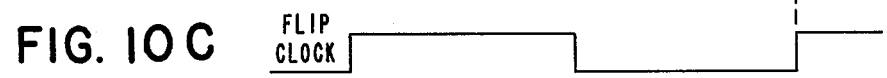

REGULATED CONVERTER WITH VOLT-BALANCING CONTROL CIRCUIT

CROSS-REFERENCE TO RELATED APPLICATIONS

Digital Controller, co-pending application Ser. No. 242,520, filed on even date herewith, invented by Ronald L. Bruckner, Ishwar S. Khamare, Joseph L. Voyer, Rodney V. Hamilton and Paul Gheorghiu.

Power Supply Diagnostic System, co-pending application Ser. No. 242,788, filed on even date herewith, invented by Ishwar S. Khamare and Rodney V. Hamilton.

BACKGROUND OF THE INVENTION

The invention relates to power supplies in general and more particularly, it relates to a digital controller which prevents the build-up of magnetic current in a pulse-width modulated driven transformer.

Traditionally, off-line analog switching regulators designs have resulted in a high component count which adversely affects the reliability, package size and overall cost. Analog feedback control systems experience both short and long term stability problems because of component drift. Secondly, each output voltage to be regulated requires a dedicated analog control system. This means that power systems which produce multiple, independent, regulated output voltages must have an independent analog controller for each voltage, since many contemporary applications require three to five independent voltages, while duplicated analog circuitry contributes significantly to the cost of their power systems. Analog systems are not flexible enough to adapt to widely varying applications.

An ideal feedback control system would be one that could incorporate the advantages of proportional and derivative control for multiple, independent, regulated output voltages at low cost in a simple implementation that is relatively independent of component drift and would adapt to different needs. In those power systems which utilize a push-pull drive arrangement, it is well known that differences in the power-on and power-off time periods of the power switching devices will cause the power transformer to gradually build up a magnetizing current resulting in the saturation of the transformer. Prior analog switching regulators in trying to solve this problem have A.C. coupled the transformer drive signals with expensive poly-carbonate or polystyrene capacitors because of their low loss characteristics in the presence of the high frequency ripple currents. It is therefore an object of this invention to provide a system controller for a power supply which is digital in construction enabling the controller to be incorporated into a single LSI circuit chip and which provides effective current balance protection. It is a further object of this invention to provide a digital controller for a power supply which prevents the build-up of magnetizing current in the transformer and utilizes pulse width modulation control for the power supply regulation. A further object of this invention is to provide a digital constructed power supply controller providing current balance protection which is simple in construction and therefore low in cost.

SUMMARY OF THE INVENTION

In order to carry out these objects, there is disclosed a digital controller for a power supply which in response to receiving feedback signals representing the output of the power supply, will generate pulse-width modulating signals for instantaneously altering the duty cycle of the clocking signals for a pair of switching transistors to compensate for variations in the output level of the power supply. Logic control means responsive to the level of the magnetizing current in the transformer to further alter the duty cycle of the clocking signals for incrementally increasing or decreasing the level of the magnetizing current in the transformer in small steps until a threshold is reached at which time the duty cycle of the clocking signals is changed to drive the magnetizing current in the opposite direction to a level opposite to that existing before the change. Once this has occurred, the incremental raising or lowering of the level of the magnetizing current in small steps is resumed until the threshold is again reached at which time the reversing of the level of the magnetizing current is repeated. The thresholds of the magnetizing current are selected to be below the saturation level of the transformer.

BRIEF DESCRIPTION OF THE DRAWINGS

Additional advantages and features of the present invention will become apparent and fully understood from a reading of the following description, taken together with the annexed drawings, in which:

FIGS. 3A–3H inclusive taken together, disclose the logic circuits for generating the pulse-width modulated control signals used in regulating the output level of one of the power output sections of the power supply.

FIG. 4 is a diagram showing the manner in which FIGS. 3A–3H inclusive are arranged with respect to each other to form the logic circuits.

FIGS. 5A and 5B taken together, disclose the logic circuits for generating control and clock signals used in regulating the power supply.

FIG. 6 is a diagram showing the manner in which FIGS. 5A–5B are arranged with respect to each other to form the logic circuits.

FIGS. 7A–7N inclusive show various wave shapes associated with the preferred embodiment.

FIGS. 9A–9E inclusive show various wave shapes associated with the preferred embodiment.

FIGS. 10A–10C inclusive show various wave shapes and an $I_M$ curve associated with the preferred embodiment.

FIG. 11 shows a second $I_M$ curve associated with the preferred embodiment.

DESCRIPTION OF THE PREFERRED EMBODIMENT

Figure 1A:
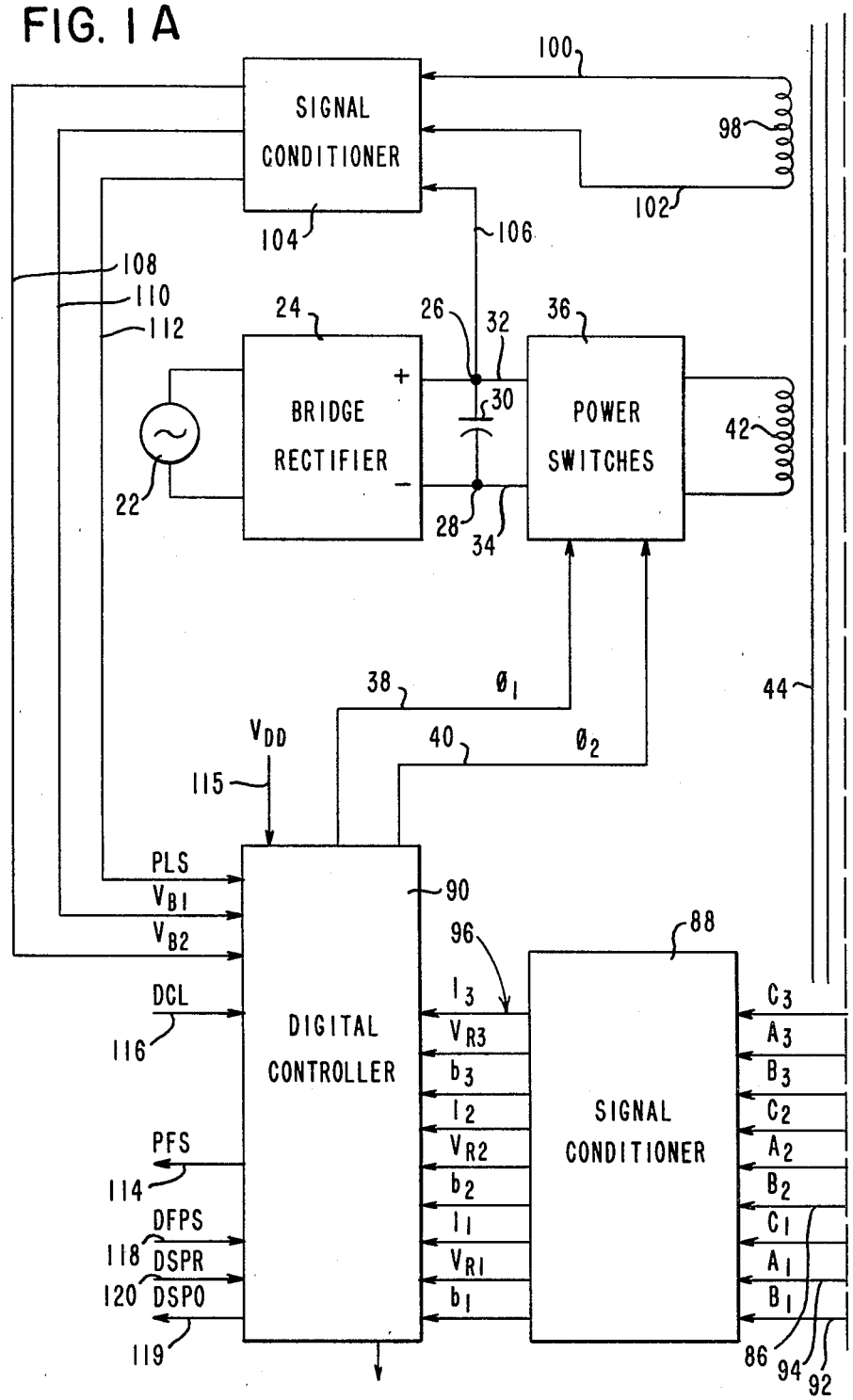
FIGS. 1A and 1B taken together disclose a block diagram of the power supply system which includes the digital controller of the present invention showing the output voltage levels of the systems.
Figure 1B:
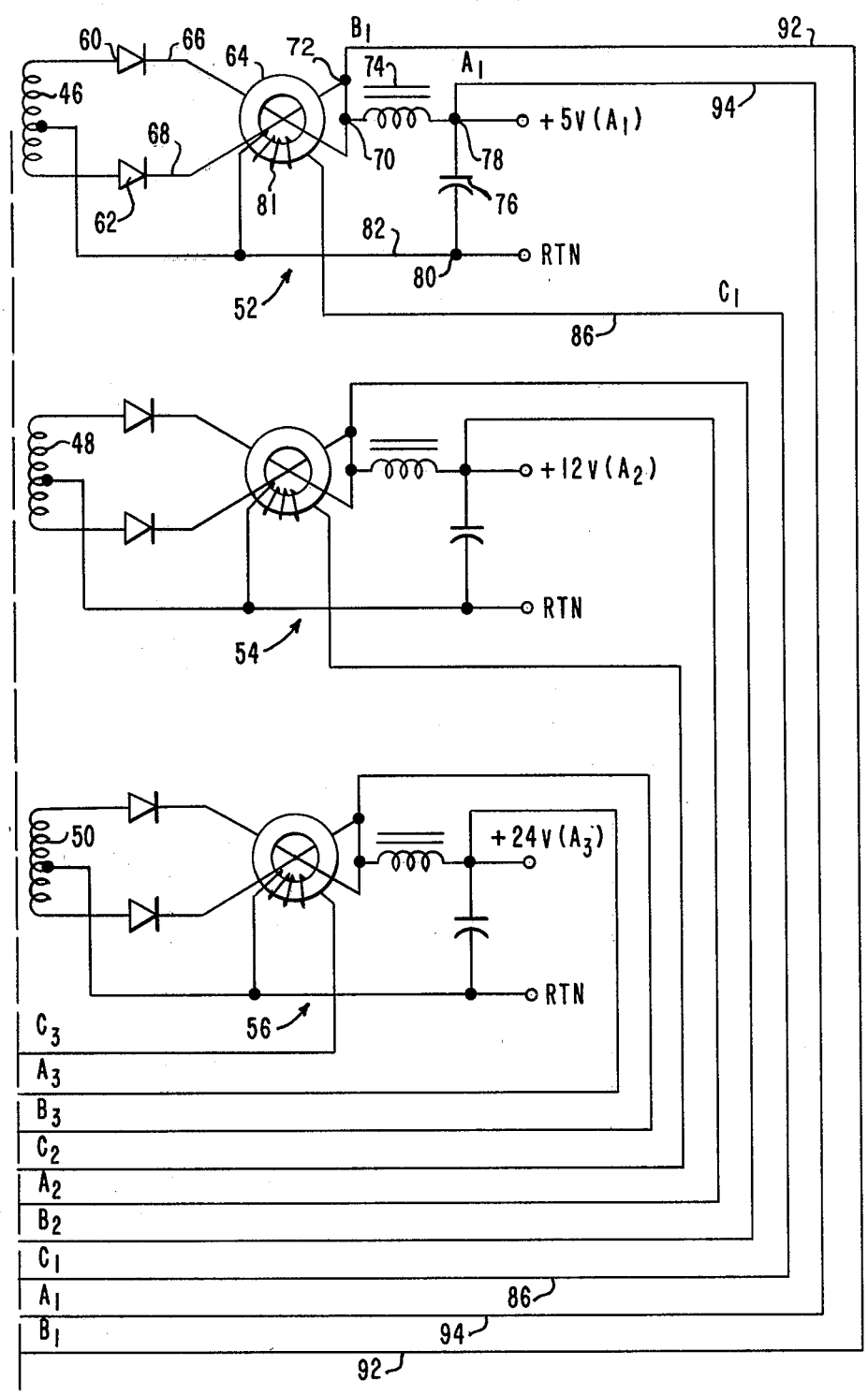

Referring now to FIGS. 1A and 1B, there is shown a partial block diagram and schematic of a regulated power supply which incorporates digital devices including the digital controller of the present invention. The power supply includes an A.C. input 22 (FIG. 1A) coupled to a conventional full-wave bridge rectifier 24.

Also included in the power supply are terminals 26 and 28 shunted by a filter capacitor 30 in a manner that is well-known in the art to provide the D.C. output at the positive and negative terminals 26 and 28 respectively. Connected to the terminals 26 and 28 by means of conductors 32 and 34 are conventional power switches 36 comprising switch transistors (not shown) which are operated 180° out of phase by switching control signals $\phi 1$ and $\phi 2$ appearing on the conductors 38 and 40 to alternatively drive the upper and lower half winding of the primary windings 42 of the transformer 44. As will be explained more fully hereinafter, the regulation of the power supply output level appearing at the primary windings 42 of the transformer 44 will be controlled by altering the duty cycle of the $\phi 1$ and $\phi 2$ control signals appearing on the conductors 38 and 40.

Associated with the transformer 44 are three secondary windings 46–50 inclusive (FIG. 1B), each associated with a power output circuit generally indicated by the numerals 52–56 inclusive. The circuit 52 will have a power output of 5 volts, the circuit 54 will output 12 volts while the circuit 56 will output 24 volts. Since each of these power output circuits are of the same construction, only circuit 52 will now be described in detail. In a manner that is well-known in the art, each of the power output circuits 52–56 inclusive includes a full-wave rectifier circuit including the rectifying diodes 60 and 62 and a current sensing transformer 64 coupled to the output of the diodes 60 and 62 by means of conductors 66 and 68 for generating the magnetic flux in the transformer 64. The conductors 66 and 68 are connected to a terminal 70 at which will appear a voltage level $B_1$. As seen in FIG. 1B, connected to the terminal 70 is a power filter circuit comprising a choke 74 and a capacitor 76. The choke 74 is connected to an output terminal 78 at which appears the voltage level $A_1$ of the output circuit. The capacitor 76 is shunted across the terminal 78 and a terminal 80 connected to a ground conductor 82. The conductor 82 is connected to the center tap 84 of the transformer 44.

The current sensing transformer 64 has associated therewith a secondary winding 81 connected to ground through the conductor 82. The other end of the transformer 64 is connected over conductor 86 to a signal conditioner 88 comprising a plurality of R.C. circuits which reduce proportionately the level of the input signal appearing on the conductor 86 to a voltage level which may be used by the CMOS circuit elements located in a digital controller 90. Appearing on conductor 86 is a signal $C_1$ representing the level of the current flowing in the transformer 64 and which is transmitted to the signal conditioner 88. As shown in FIG. 1B, the voltage level signals $B_1$ appearing at the terminal 72 are transmitted to the signal conditioner 88 over conductor 92 while the voltage level signals $A_1$ appearing at the terminal 78 are transmitted over conductor 94 to the conditioner 88. In a similar manner, the current and voltage level signals of the power output circuits 54 and 56 and also connected to the conditioner 88. The resulting voltage signals $V_{RI}$, $b_1$ and $I_1$ (FIG. 1A) generated by the conditioner 88 and representing the input signals $A_1$, $B_1$ and $C_1$ respectively of the circuit 52 are transmitted over conductors 96 to the digital controller 90, enabling the controller to regulate the output of the power supply in accordance with the signals received from the conditioner 88.

As shown in FIG. 1A, the transformer 44 has disposed thereon a secondary winding 98 which is connected by means of conductors 100 and 102 to a second signal conditioner 104 which is similar in construction and operates in the same manner as that of the signal conditioner 88. The secondary windings 98 will generate a pair of balance signals $B_{S1}$ (FIG. 9A) and $B_{S2}$ (FIG. 9B) over the conductors 100 and 102, representing the voltage level developed in the transformer 44. These signals, as will be described more fully hereinafter, will be used in reducing the effect of the magnetizing current flow in the transformer 44 due to the unequal volt second drive from the operation of the switching transistors 36. Also connected to the signal conditioner 104 is a conductor 106 connected to the terminal 26 from which a power loss signal (PLS) is generated representing the condition of a bulk voltage level of 150 volts to 300 volts developed at the output of the rectifier 24. This signal is used by the digital controller 90 in detecting a power failure. The signal conditioner 104 will output the balance signals VB1 (FIG. 9C) and VB2 (FIG. 9D) over conductors 108 and 110 and the signal PLS over conductor 112 to the digital controller 90. The controller 90 in response to the signals appearing on the conductors 108–112 inclusive will then enter into a power up sequence characterized as a "soft start sequence" enabling the operation of the power supply to start in a manner that will be described more fully hereinafter. Prior to receiving the signal PLS, the controller 90 is reset at this time. When the signal PLS goes high, indicating that the output voltage level of the rectifier 24 has reached 78% of its normal value, the power signal $V_{DD}$ appearing on conductor 115 is connected to the remainder of the controller 90 enabling the controller for operation.

After being reset, the controller will initiate a delay of 60 ms. or 3 power line cycles. When the delay is complete, the switching control signals $\phi 1$ and $\phi 2$ appearing on the conductors 38 and 40 and which are generated in the digital controller 90 will begin switching at a minimum duty cycle period which duty cycle period will be incrementally increased after a predetermined time period has elapsed. This switching action will continue until an overcurrent is detected in the transformer 64 (FIG. 1B). Upon the detection of an overcurrent condition, the signals $\phi 1$ and $\phi 2$ will start switching at a second predetermined or constant minimum duty cycle until the overcurrent condition is removed at which time the signals $\phi_1$ and $\phi_2$ will resume switching at the duty cycle existing prior to the detection of the overcurrent condition. This soft start operation continues until the voltage level $A_1$ appearing at the terminal 78 in the power output circuit 52 reaches 90% of its normal value or until 100 ms. from the beginning of the switching operation has elapsed, whichever occurs first. If the predetermined voltage level $A_1$ occurring at terminal 78 is reached first, the controller continues its soft start operation for another 20 ms. (or 1 power line cycle) and then commences a regulation mode of operation.

When the controller is operating in the regulation mode, the duty cycle of the switching signals $\phi 1$ and $\phi 2$ are continuously adjusted based on the voltage levels $A_1$ and $B_1$ appearing at the terminals 70 and 78 respectively in the power output circuit 52 to maintain a plus or minus 1 percent static regulation and plus or minus 2 percent dynamic regulation of the power output circuit 52 (FIG. 1B). During the regulation mode, the controller continuously monitors the feedback data generated by the signal conditioner 88 and will stop the generation of the signals $\phi 1$ and $\phi 2$ upon sensing the occurrence of a system fault. At this time, the controller will disconnect its own power, leaving a diagnostic data latch and the circuitry associated with the signal PLS operational. The diagnostic data latch will be accessible by a serviceman at a later time. As disclosed in the previously cited co-pending application of Khamare et al., Ser. No. 242,788, the controller shall have the capability to display the fault isolation condition on a plurality of light-emitting diodes for a period of 20 seconds when enabled.

As will be described more fully hereinafter, the controller 90 will output a high signal PFS (power fail sense) over conductor 114, (FIG. 1A), indicating the occurrence of a power loss. The controller 90 will also receive a manually selected signal DCL over conductor 116 selecting either a single ended or double ended rectification mode of operation of the power system. When selected for a single ended operation, the maximum duty cycle of the switching signals $\phi_1$ or $\phi_2$ shall be reduced to 66 percent of their value in the double ended operation. A manually selected signal DFPS appearing on conductor 118 selects either a 20 KHz. or 40 KHz. switching frequencies while a signal DSPR appearing on conductor 120 is a reset signal to the serial readout diagnostic output latches (not shown). For a complete disclosure of the diagnostic circuitry associated with the controller 90, reference should be made to the previously cited corresponding application Ser. No. 242,788 of Khamare et al.

Figure 2:
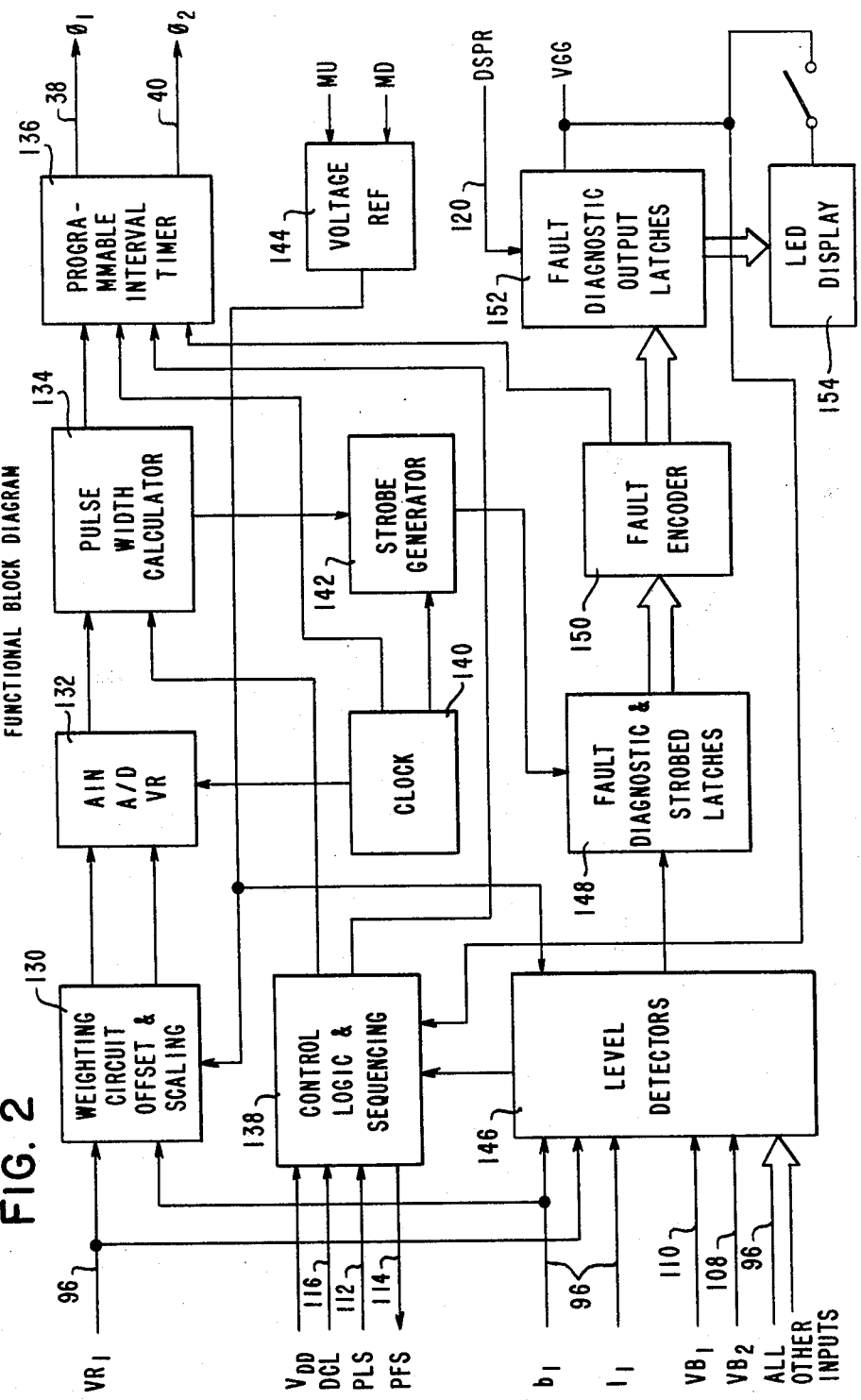
FIG. 2 is a block diagram of the digital controller of the present invention.

Referring now to FIG. 2, there is shown a block diagram of the digital controller 90. The controller 90 will regulate the power supply output by altering the duty cycle of the $\phi_1$ and $\phi_2$ signals for the power transistor switches 36 (FIG. 1A). This information is contained in the power level signals $A_1$ and $B_1$ appearing at the terminals 78 and 70 of the power level circuit 52 (FIG. 1B). By monitoring the power supply output voltage present at these terminals, the controller can adjust the $\phi_1$ and $\phi_2$ duty cycle up or down to counteract the change in the output voltage of the power output circuit 52 (FIG. 1B). The linear control equation used in the present embodiment is given as follows:

$$TPW = T_0 + T_3$$

where TPW is a calculated total pulse width; $T_0$ is equal to a nominal pulse width for the given power supply and $T_3$ is equal to a pulse width correction.

The nominal pulse width $T_0$ which is fixed for the given supply which in this present embodiment is 5 volts, can be calculated by the following equation:

$$V_{OR} = V_{IN} \times DC$$

and DC is equal to $T_{ON}/T$, where
  $V_{OR}$ is equal to the output voltage to be regulated;
  $V_{IN}$ is equal to the input voltage to the power filter appearing at the terminal 70 (FIG. 1B);
  DC is equal to the duty cycle;
  $T_{ON}$ is equal to on time, and
  T is equal to switching period.
  For a 5 volt power supply with a 12 volt input, DC is equal to $5/12 = 0.4166 = 41.66\%$
And for 40 KHz. (24 microseconds) switching frequency, the nominal pulse width, $T_0$ which is equal to $T_{ON} = 0.4166 \times 25$ microseconds which is equal to 10.415 microseconds.

The pulse width correction $T_3$ is calculated by:

$$T_3 = -K_1(d - d_0) - K_2(d - d_1).$$

where:
  $K_1$ and $K_2$ are scaling factors which in the present embodiment are represented by 2 and 8 respectively.
  $d_0$ is equal to the digital equivalent of the output voltage to be regulated which in the present embodiment is 5 volts;
  d is equal to the digital equivalent of the present sample of the output voltage; and
  $d_1$ is equal to the digital equivalent of the preceding sample of the output voltage.

To assure that the $\phi_1$ and $\phi_2$ clock signals will never be on simultaneously, a 5 percent deadband is provided so that the duty cycle of both the $\phi_1$ and $\phi_2$ signals shall be greater than 5 percent and less than 45 percent.

As shown in FIG. 2, the digital power controller 90 includes a weighting circuit 130 enabling the value of the power output level signals $V_{R1}$ appearing on line 96 (FIG. 1A) to be adjusted to a level capable of being processed by the CMOS circuits of the controller. The output of the circuit 130 is transmitted to an analog/digital converter 132 which converts the analog voltage signals into proportional digital signals. These digital signals are then transmitted to a pulse width calculator circuit 134 for calculating the pulse width of the switching signals $\phi_1$ and $\phi_2$ which signals are then outputted over conductors 38 and 40 from a programmable interval timer 136 to the switching transistors 36 (FIG. 1A). Associated with these circuits is a control logic and sequencing circuit 138 for logically operating the circuits 134 and 136. Also included in the controller 90 is a clock circuit 140 for generating the various clock signals used in the operation of the controller, together with a strobe generator circuit 142 for use in sensing the occurrence of a fault condition within the power system. Further included in the controller 90 is a reference voltage source 144 whose level may be adjusted by the signals MU and MD, together with level detectors 146 for sensing the various power levels occurring in various elements of the controller. A fault diagnostic and strobe latch 148, together with a fault encoder 150, fault diagnostic output latches 152 and a LED display 154 constitute the diagnostic circuit associated with the controller. Reference should be made to the previously cited Ser. No. 242,788 for a complete disclosure of the diagnostic circuits of the controller.

Figure 3A:
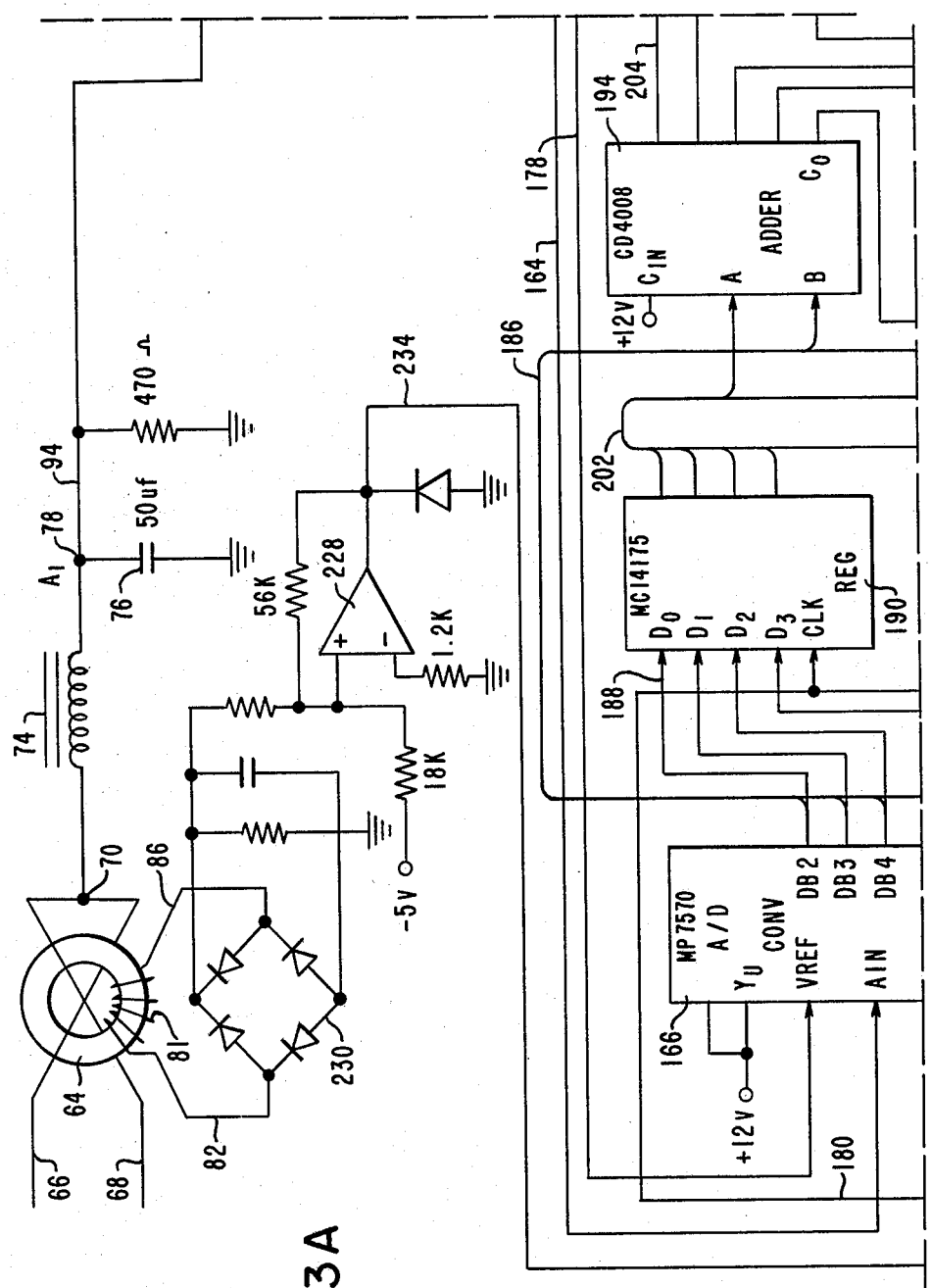
Figure 3B:
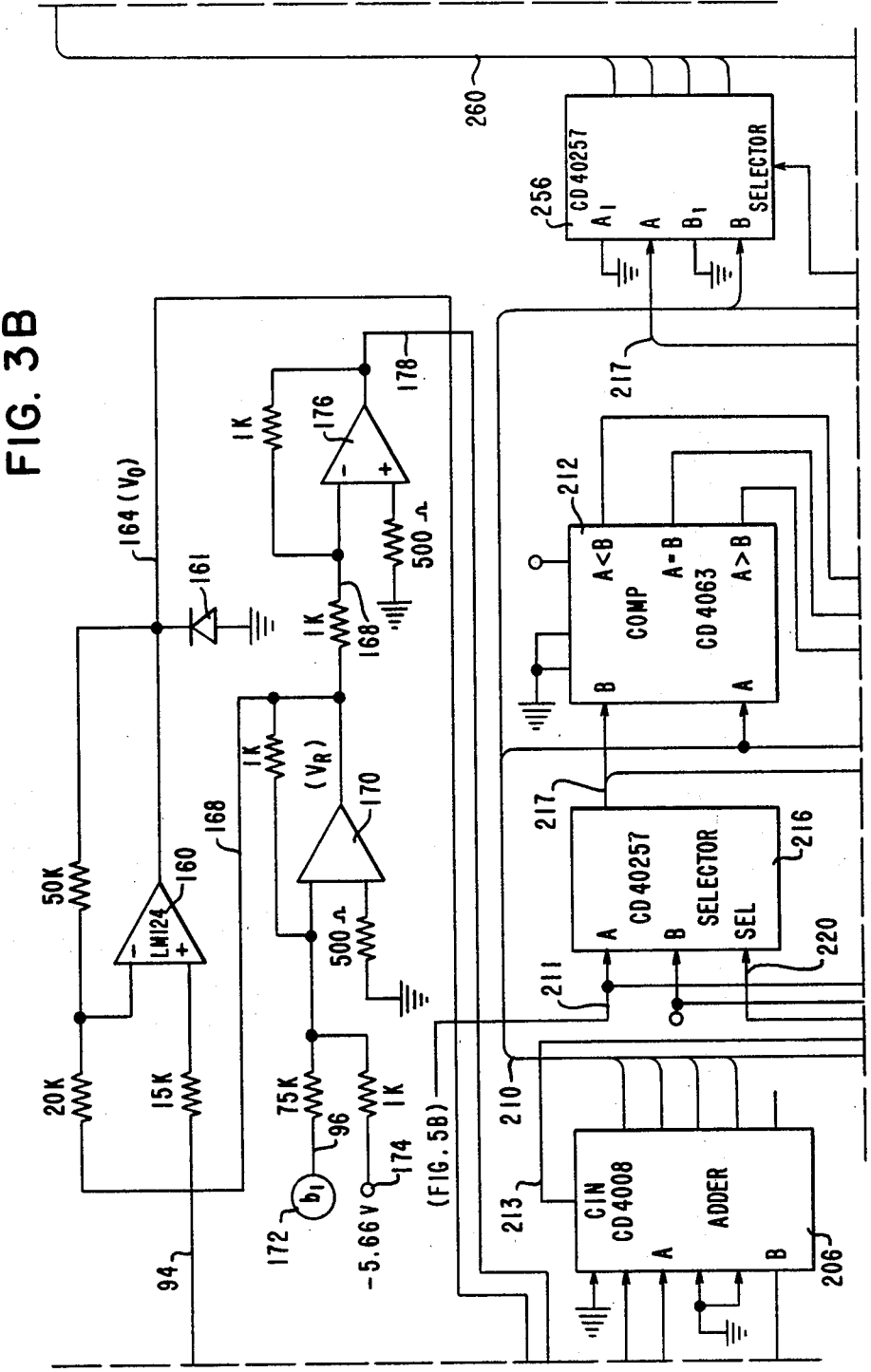
Figure 3C:
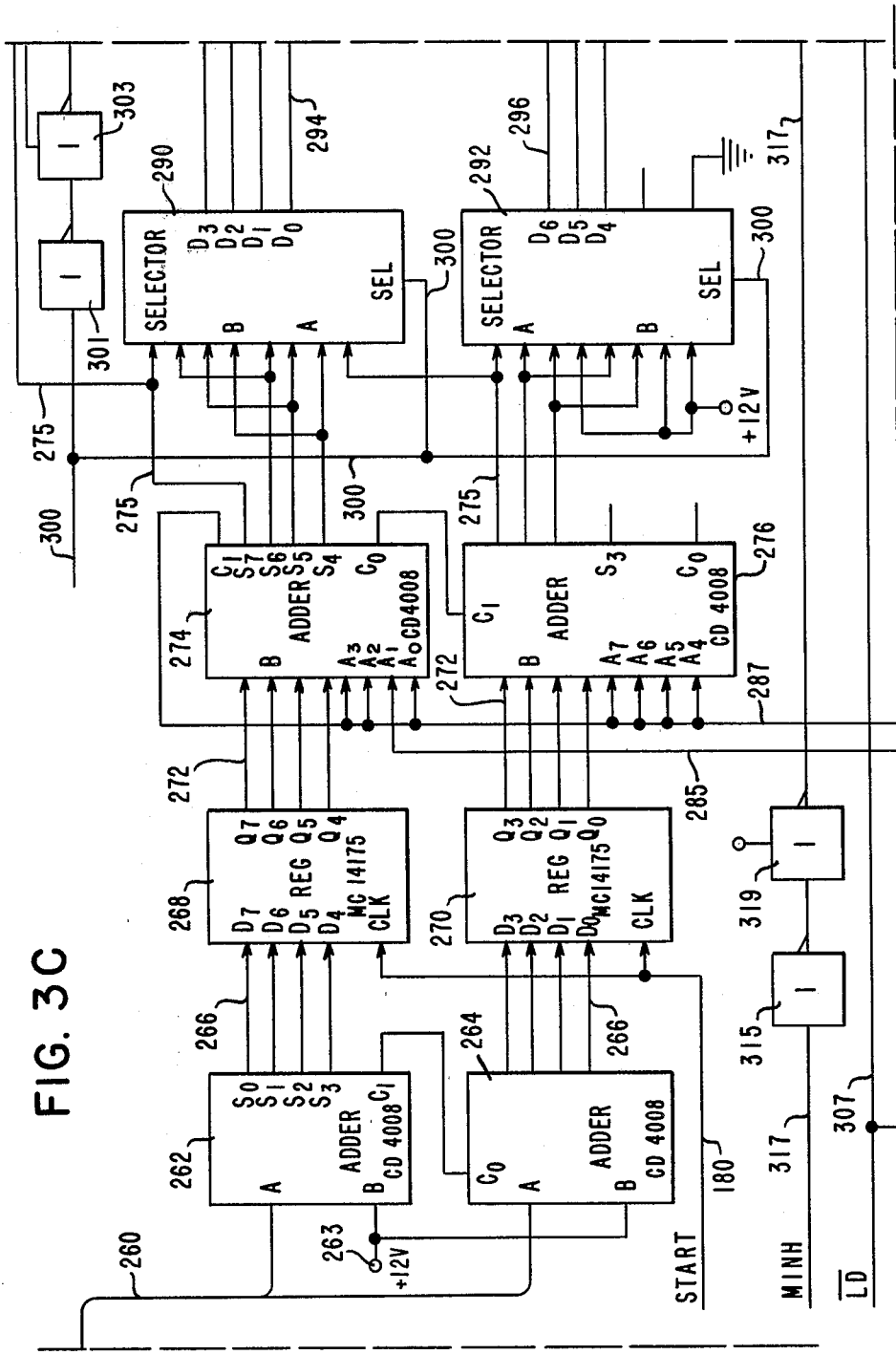
Figure 3D:
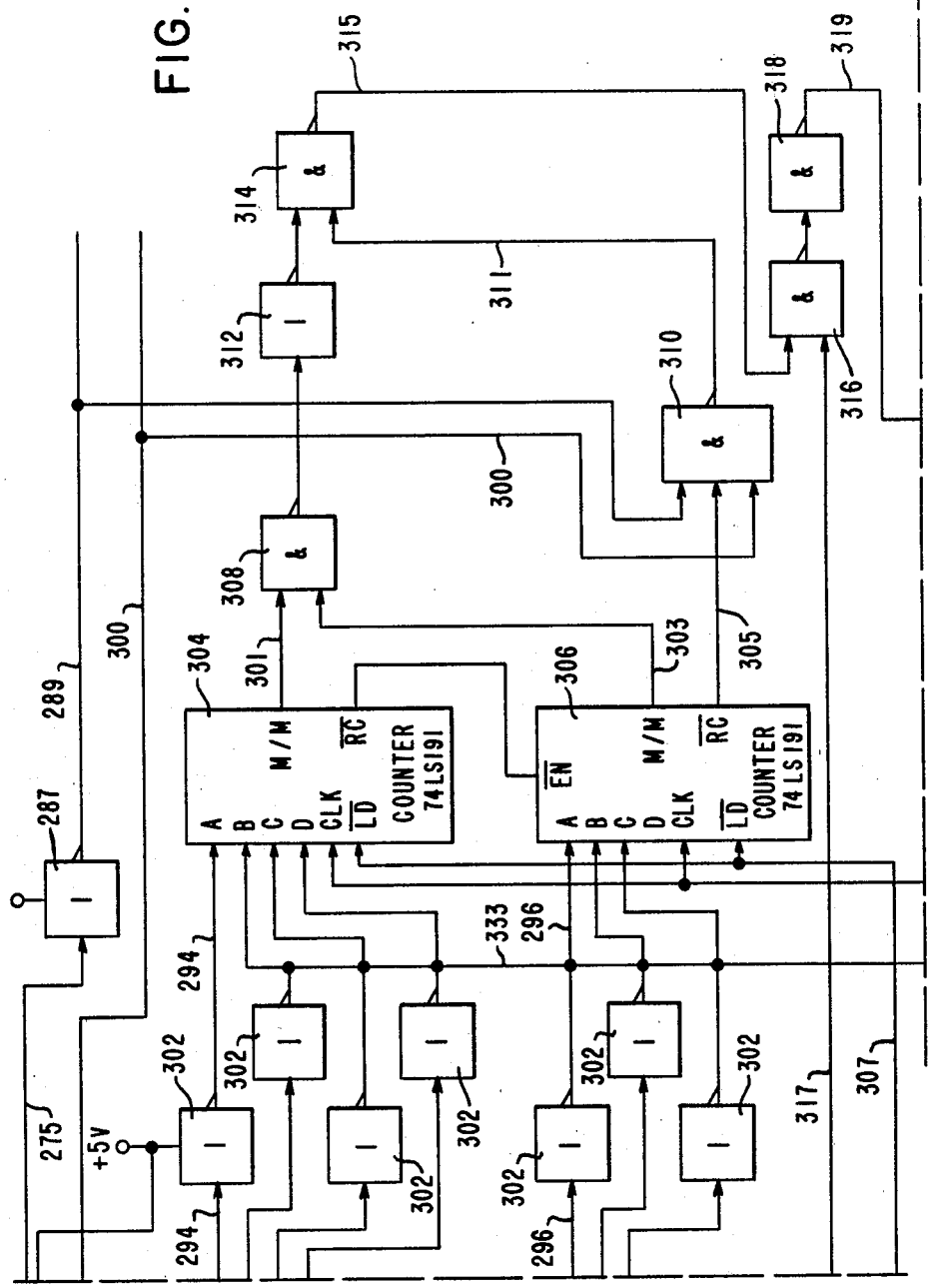
Figure 3E:
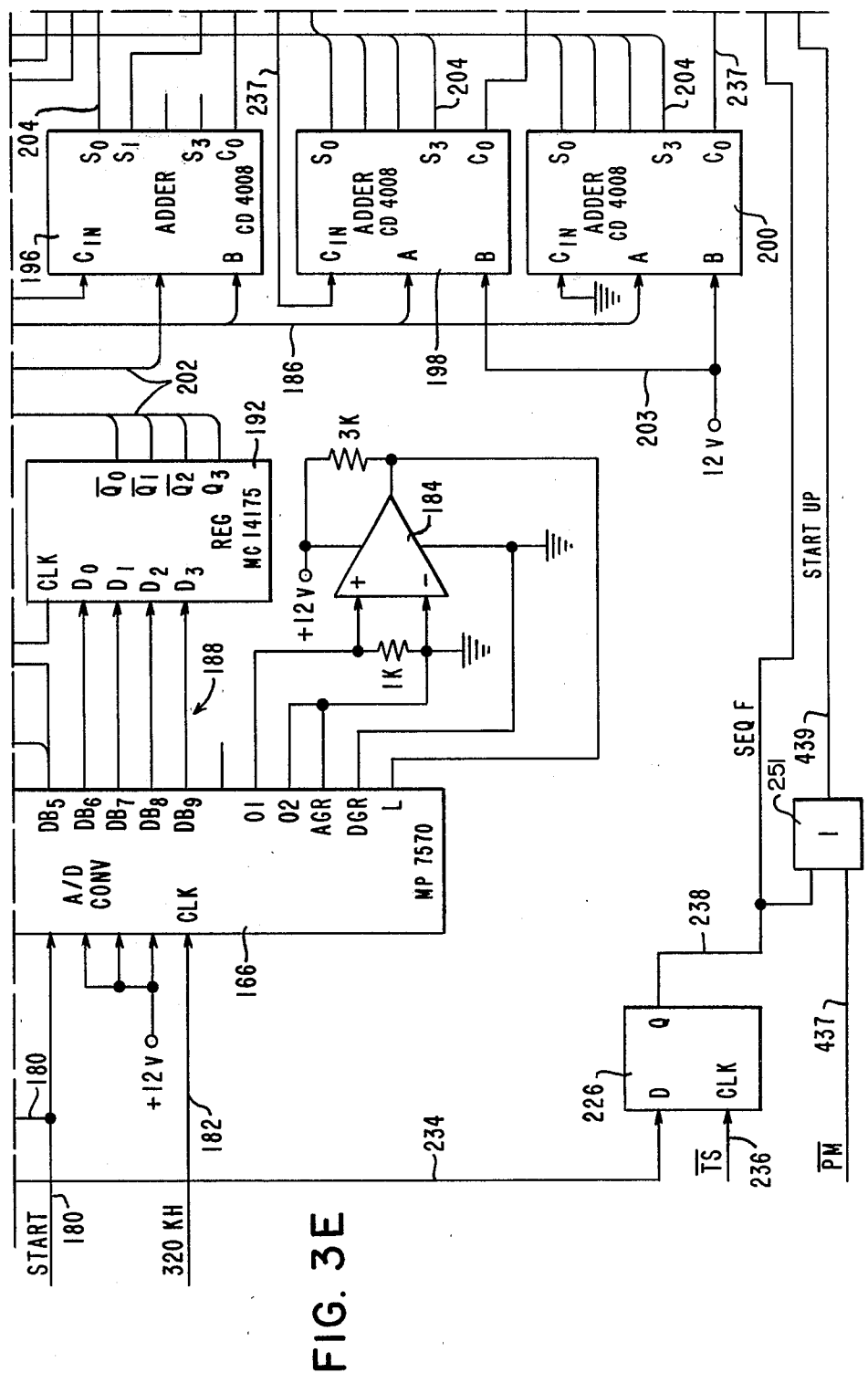

Referring now to FIGS. 3A-3H inclusive, there is shown a logic diagram of the weighting circuit 130, the analog/digital circuit 132, the pulse-width calculator circuit 134, the programmable interval timer circuit 136 and the strobe generator circuit 142 (FIG. 2) of the controller 90. As seen in FIG. 3A, the current sense transformer 64 associated with the 5 volt power output circuit 52 (FIG. 1B) is coupled to the output conductors 66 and 68 of the diodes 60 and 62 (FIG. 1B) through which the current generated by the transformer 44 (FIG. 1A) flows. Connected between the terminal 72 and the terminal 70 is a choke 74 (FIG. 1B). At terminal 70 will appear the output level $A_1$ of the circuit. This signal $A_1$ representing the voltage level of the power supply during a sampling period is transmitted over conductor 94 to the non-inverting (+) input of a LM124 scaling operational amplifier 160 (FIG. 3B), whose output voltage pulse $V_0$ is transmitted over conductor 164 to the analog input of a MP7570 A/D converter 166 (FIGS. 3A and 3E). The operational amplifier 160 receives over conductor 168 a reference voltage $V_R$ outputted by an LM124 operational amplifier 170. The reference voltage $V_R$ is a function of the voltage level originally appearing at the terminal 70 (FIG. 1B) and varies with the line voltage 172. This signal $b_1$ appearing on conductor 96 is controlled by a negative 5.66 voltage pulse appearing on the input 174, allowing the reference voltage signal $V_R$ to correspond to the line voltage. The output of the amplifier 170 is directed to the inverted input of an LM124 operational amplifier 176, which inverts the reference voltage $V_R$. This inverted signal is then outputted over conductor 178 to the voltage reference input of the A/D converter 166 (FIGS. 3A and 3E).

The A/D converter 166 receives over conductor 180 the signal START (FIG. 7F) initiating the operation of the A/D converter in addition to the 320 KHz. clock signals (FIG. 7A) over conductor 182. The A/D converter will output over conductor 186 and 188 an 8 bit binary word representing the present sample of the voltage level of the power circuit representing the term d in the regulation equation previously cited. The voltage level output of the power circuit is sampled at a 50 microsecond rate with the resulting 8 bit words outputted over conductors 188 to a pair of MC14175B registers 190 (FIG. 3A) and 192 (FIG. 3E) for storage therein. The four least significant bits of the data word outputted over conductors 188 are inputted into the register 190 while the four most significant bits are stored in the register 192. As the 8 bit word representing the present value d of the power level is being outputted by the A/D converter 166, the value of the previous sampled level is stored in the registers 190 and 192 representing the previous data $d_1$. The present data d also appears on the output lines 186 of the A/D converter 165 and are loaded into the B input of a pair of CD4008B binary adders 194 and 196 (FIGS. 3A and 3E) and into the A input of a pair of CD 4008B binary adders 198 and 200 (FIG. 3E). The adders 194 and 196 will receive at their A input the previous binary data stored in the registers 190 and 192 over conductors 202 enabling the adders 194 and 196 to produce the term $d-d_1$ by performing a two's complement subtraction operation while the adders 198 and 200 will receive at their B input an 8 bit binary word from source 201 and transmitted over conductor 203 (FIG. 3E) which is the two's complement of the value $d_0$ enabling the adders 198 and 200 to produce the term $d-d_0$ by performing a two's complement subtraction operation. In the present example, the binary word appearing on line 203 and generated by the 12 volt power source 201 is the value of 5 V in the two's complement form representing the normal output of the power supply circuit 52 (FIG. 1B).

Figure 3F:
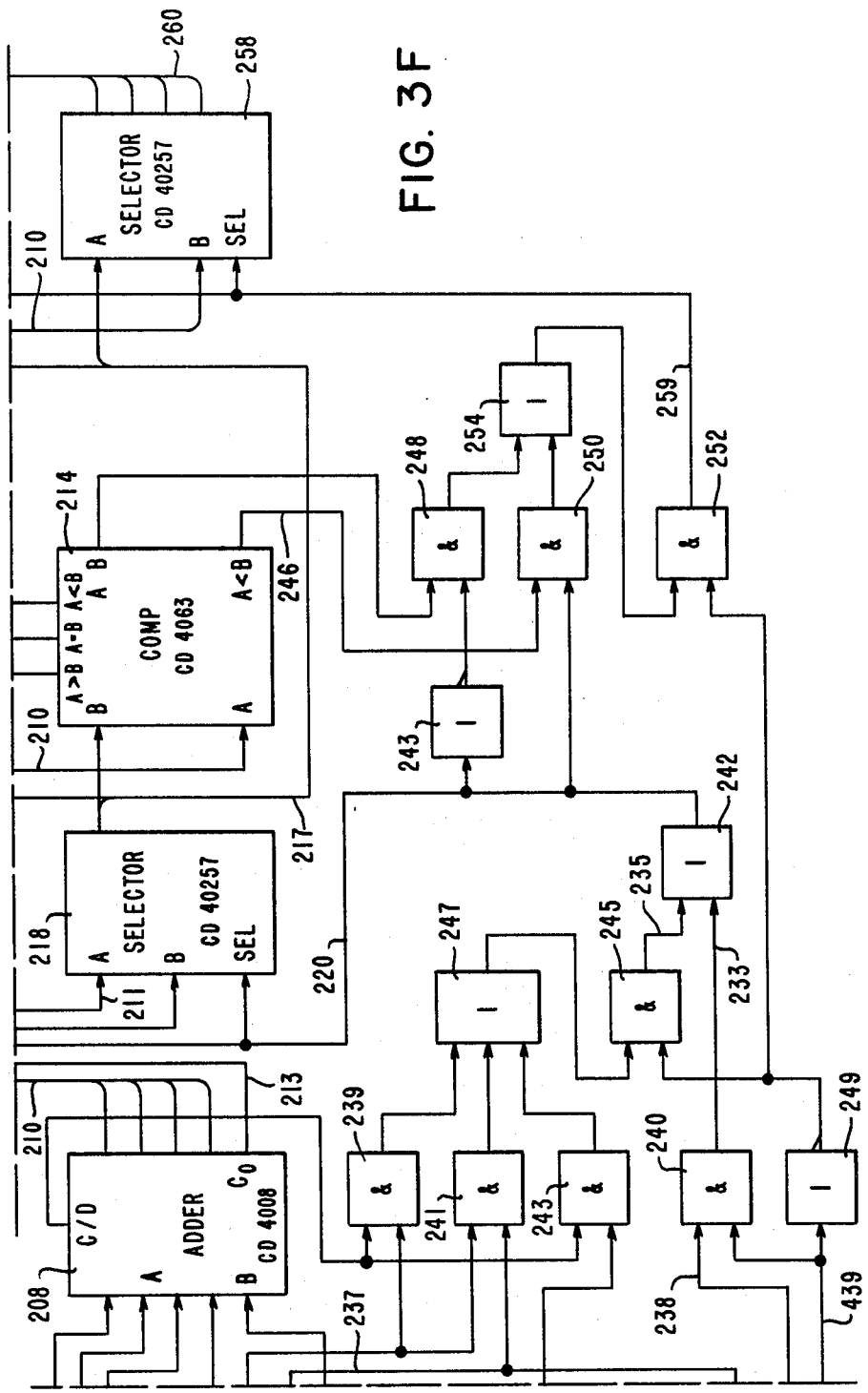

The binary output of the adders 194-200 inclusive (FIGS. 3A and 3E) are outputted over conductors 204 to a pair of CD4008B adders 206 (FIG. 3B) and 208 (FIG. 3F) which combine both input terms to output in a two's complement form the term $(d-d_0)+4(d-d_1)$. In order to arrive at the term $4(d-d_1)$, the binary bits outputted by the adders 194 and 196 are shifted two places when inputted into the adders 206 and 208. The term $(d-d_0)+4(d-d_1)$ is outputted over conductors 210 to the A input of a pair of CD4063B comparators 212 (FIG. 3B) and 214 (FIG. 3F) which also receives at its B input a binary word from a pair of CD 40257B selector circuits 216 (FIG. 3B) and 218 (FIG. 3F).

As previously described, the duty cycle of the switching cntrol signals $\phi_1$ and $\phi_2$ will have a 5 percent deadband to provide that the duty cycle of both signals shall be greater than 5 percent and less than 45 percent. As will be described more fully hereinafter, the controller 90 will initiate a soft start operation of the power supply in which the pulse width of the switching control signals $\phi_1$ and $\phi_2$ are slowly increased until the power output of the circuit reaches 90% of the normal output. As part of this operation, there is sequentially generated on conductor 211 a plurality of binary words each successively representing a larger pulse width for the switching signals $\phi_1$ and $\phi_2$ and which constitute the upper limit of the pulse width. These binary signals are inputted into the A input of the selector circuits 216 and 218. The B input of the selector circuits 216 and 218 will have a binary value representing one-half of the 5 percent lower limit. The selector circuits 216 and 218 are operated by a selecting signal appearing on the input conductor 220 representing the output level of the power supply. This selecting signal enables the selector circuits 216 and 218 to output over conductors 217 the upper or lower duty cycle limit in accordance with the output level of the power supply. The selecting signal is derived from a signal generated by the Q output of a flip-flop 226 (FIG. 3E) which in turn receives at its D input an output signal generated by an operational amplifier 228 (FIG. 3A) representing the level of the current appearing in the output transformer 44.

As shown in FIG. 3A, the current sense transformer 64 has auxiliary windings 81 for generating a signal representing the level of the current appearing in the power circuit. This signal is transmitted to a bridge rectifier 230 which will output a D.C. voltage pulse to the non-inverting (+) input of a LM124 operational amplifier 228. The output voltage signal of the amplifier 228 representing an overcurrent condition or an undercurrent condition of the circuit is transmitted over conductor 234 to the D input of the flip-flop 226 (FIG. 3E) which, upon the clocking of the flip-flop by the clock signal $\overline{TS}$ appearing on conductor 236 is transmitted over line 238 to a gate circuit which includes an AND gate 240 and an OR gate 242. The OR gate 242 in addition to the signal appearing on conductor 233 from the AND gate 240 receives the output signal over conductor 235 from a gate circuit which includes the AND gates 239, 241, 243 and 245 and the OR gate 247. The gate circuit receives the control signal PM appearing on conductor 437 (FIGS. 3E and 8) which is low during the operation of the power supply. The signal $\overline{PM}$ is transmitted through an OR gate 251 (FIG. 3E), over conductor 439 to the AND gate 240 (FIG. 3F), the inverter 249 to the AND gate 245. This gate circuit generates a signal in response to the level of the carry out signals generated by the adders 194-208 inclusive thereby enabling the signal outputted by the AND gate 242 to select a value representing the pulse-width word which is within the limits of 2.5 and 22.5 percent of the duty cycle. If the output signal appearing on the conductor 220 is high indicating the existence of an overcurrent condition, the selectors 216 and 218 will be operated to output the binary word representing the lower limit appearing at the B input which is equivalent to $2\frac{1}{2}$ percent of the ducty cycle.

In a similar manner, if the voltage level of the power supply is at a level which represents an undercurrent condition, the selector circuits 216 and 218 will be operated by a low signal on conductor 220 to output a binary word representing an upper limit for controlling the switch control signals $\phi_1$ and $\phi_2$. As will be explained more fully hereinafter, this binary word has a pulse width greater than 5 percent duty cycle but equal to or less than 45 percent duty cycle depending on the binary word transmitted over conductor 211 and appearing at the A input of the selector circuits 216 and 218 at this time. These signals appearing on output conductors 217 of the selectors 216 and 218, together with the current term appearing on the output conductors 210 of the adders 206 (FIG. 3B) and 208 (FIG. 3F) are inputted into the CD 4063 comparators 212 (FIG. 3B) and 214 (FIG. 3F), which compares the present term with the selected limit and outputs the appropriate signals over the output conductors 244 and 246 to a logic gate circuit comprising the AND gates 248-252 inclusive and the OR gate 254. The output of the AND gate 252 is connected to the select inputs of a pair of CD40257B selector circuits 256 (FIG. 3B) and 258 (FIG. 3D).

The selector circuits 256 and 258 enabled by the control signal appearing on the output conductor 259 of the AND gate 252, selects the binary word appearing on conductors 217 representing the selected limit or in the case where the calculated data appearing on conductor 210 is between the upper and lower limits, the calculated data itself. As may be seen from FIG. 3B, the $A_1$ bit input and the $B_1$ bit input of the selector circuit 256 are tied to ground resulting in the binary bits appearing on the input conductors 210 and 217 being shifted one bit position when loaded into the selectors 256 and 258, thereby enabling the output signals of the selectors 256 and 258 to represent the term $2[(d-d_0)+4(d-d_1)]$. This term represents the pulse-width correction term $T_3$ in the previously cited total pulse-width equation and will appear on the output conductors 260 of the selector circuits 256 and 258 for transmission to the A input of a pair of CD4008B adder circuits 262 and 264 (FIG. 3C). Appearing at the B input of the adders circuits 262 and 264 is a binary value in the one's complement form representing the nominal pulse-width for a 5 volt power supply corresponding to the term $T_0$ in the previously-cited pulse-width equation. The adder circuits 262 and 264 will output over conductors 266 the binary word TPW representing the total pulse width of the switching control signals $\phi 1$ and $\phi 2$ to a pair of registers 268 and 270 (FIG. 3C) for storage therein under the control of the clocking signal START (FIG. 7F) appearing on conductor 180. The registers 268 and 270 will output the binary word representing the total pulse-width word TPW over conductor 272 to a pair of CD4008B adders 274 and 276 (FIG. 3C) whose output value will be implemented in accordance with a balancing operation which will now be described.

Figure 9E:
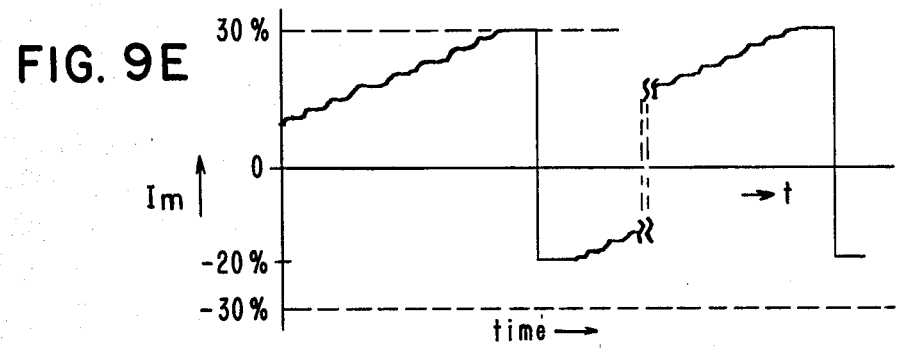

As is well-known in the art, a long-term imbalance in the transformer 44 (FIG. 1A) results in a buildup of the magnetizing current due to the unequal volt second drive from the power switches 36 (FIG. 1A). In order to eliminate this buildup of the magnetizing current, the controller 90 provides positive and negative threshold detectors such that the output pulse-width signal TPW appearing on the conductors 272 of the registers 268 and 270 is increased/decreased upon the detection of each opposite threshold. The effect of this balance correction to the pulse modulating signal on the magnetizing current $I_M$ in the transformer is shown in FIGS. 9E and 11. When the buildup of the magnetizing current reaches a selected threshold, the controller applies an opposite imbalance which may have a magnitude equal to 50% of the saturation current. FIG. 9E shows the accrual of the magnetizing current ($I_M$) until it reaches the positive threshold at which time a 50% correction is applied driving the current to a level which, in the present example, is 20% of the saturation limit. FIG. 11 shows the condition where the negative threshold is reached and a correction of opposite polarity is applied. In both examples, the thresholds and the amount of correction are arbitrarily selected. An $I_M$ negative and positive threshold which is 30 percent of the maximum magnetizing current level is selected which is well below the necessary level of saturation.

When the normal buildup of the magnetizing current reaches the positive threshold (FIG. 9E), a LM139 voltage comparator 281A (FIG. 3G) is enabled. This action, as will be explained more fully hereinafter, results in the subtraction of a count from the total pulse-width (TPW) word. When the adjusted TPW word is applied to the clock control signals $\phi_1$ and $\phi_2$, the curve of the magnetizing current $I_M$ (FIG. 9E) is driven in the opposite direction to a predetermined level depending on the value of the count. At this time, the controller 90 will resume its normal switching operation resulting in the $I_M$ curve moving in an upward direction as illustrated in FIG. 9E until the positive threshold is again reached where again the process causing the $I_M$ curve to be reversed as shown in FIG. 9E is repeated. It will be seen that this arrangement prevents the $I_M$ curve from reaching the saturation level of the transformer 44. Where the $I_M$ curve normally moves in the opposite direction (FIG. 11), a second LM139 voltage comparator 281B (FIG. 3G) is enabled which drives the $I_M$ curve in the opposite direction.

The signals for controlling this balancing operation in addition to the output signals of the comparators 281A and 281B are signals generated by the EXCLUSIVE OR gate 280 (FIG. 3G) which receives the control signal FLIP (FIG. 8) over conductor 284 and the clock signal FLIPCLOCK (FIGS. 5B and 10C) over conductor 286 which originate in the signal conditioning circuit 104 (FIG. 1A). The signal FLIP appearing on the output conductor 284 of the voltage comparator 283 (FIG. 8) will go high when VB1 (FIG. 9C) is greater than VB2 (FIG. 9D) and will go low when VB2 is greater than VB1. Thus when the $I_M$ curve (FIGS. 9E and 11) is in the positive region of the saturation current, the signal FLIP is high and when the curve is in the negative region, the signal FLIP is low. The output signal of the gate 280 is inputted into one of the select inputs of a CD4529 selector 273 (FIG. 3G) which also receives at the other select input a signal from one of the two LM139 voltage comparators 281A and 281B whose output signals are transmitted through the OR gate 289. The comparator 281A receives the balance signal VB1 (FIGS. 1A and 9C) over conductor 110 while the comparator 281B receives the balance signal VB2 (FIG. 9D) over conductor 108 (FIG. 1A). The comparators 281A and 281B compare the balance signals with a reference voltage appearing on conductors 145 and 147 representing a value which is selected to equal 30% of the saturation current of the transformer 44 and which is used for detecting the negative and positive thresholds of the $I_M$ curve (FIG. 9E).

The selector 273 (FIG. 3G) receives at its A input over conductor 277 the binary word K representing a Δ DC term whose value will produce a TPW word to drive the $I_M$ curve (FIG. 9E) in the opposite direction to a level which is equal to 20% of the saturation current of the transformer 44 in the manner described previously. The selector 273 receives at its B input the constant −K which is the two's complement of the binary word K while the C and D inputs are tied to ground. Each time the signal FLIPCLOCK goes high (FIG. 10C), and with the signal FLIP being high and both comparators 281A and 281B outputting high signals, the selector 273 will output over conductors 285 and 287 (FIGS. 3C and 3G) the low signals appearing at the C and D inputs of the selector to the A inputs of the adders 274 and 276 which output the calculated data appearing at the B inputs of the adders resulting in the $I_M$ curve (FIG. 9E) moving upward until the positive threshold is reached. At this time the threshold detector 281A (FIG. 3G) will switch its output signal to low enabling the selector 273 to output the constant −K appearing on the input conductor 279 during the time the control signal $\phi_1$ is active. As will be explained more fully hereinafter, after 25 us. have elapsed, the signal FLIPCLOCK will go low (FIG. 10C) wherein the selector 273 will output the constant K during the time the control signal $\phi_2$ is active. The effect of this operation on the adders 274 and 276 is to produce pulse-width words which affect the signals $\phi_1$ and $\phi_2$ to drive the $I_M$ curve in the opposite direction as shown in FIG. 9E to a level which is a −20% of the saturation level of the transformer. After the $I_M$ curve (FIG. 9E) has reached the lower level, the threshold detector 281A will output a high signal enabling the selector 273 to output again the low signals appearing at the C and D input to the adders 274 and 276 allowing the controller 90 to resume its normal switching operation. If the $I_M$ curve (FIG. 9E) is allowed to move down until the negative threshold is detected, the threshold detector 281B is enabled to output a low signal enabling the selector 273 to output the constant K during the time the signal $\phi_1$ is active and the constant −K during the time the signal $\phi_2$ is active.

The output binary word representing the total pulse-width from the adders 274 and 276 is transmitted over conductors 286 to a pair of CD4069 selector circuits 290 and 292 (FIG. 3C) which will output over conductors 294 and 296 respectively a binary word representing the pulse-width value when operating at a switching frequency of either 20 KHz. or 40 KHz. The selectors 290 and 292 are operated by a manually selected signal FRESEQ appearing on conductor 300 which will be low when 20 KHz. is selected as the switching frequency or high when the 40 KHz. is selected. The output binary bits of the selectors 290 and 292 are transmitted through a series of inverters 302 providing a level shift of the binary bits from the one's complement form for use with the TTL construction of a pair of 74LS191 binary counters 304 and 306 (FIG. 3D). The counters are preset by the binary signals received over conductors 294 and 296 to initiate a counting sequence in which the counters 304 and 306 will count down to zero. Upon reaching zero, the counters 304 and 306 will output control signals over conductors 301, 303 and 305 and through the gates 308–318 inclusive to the clear input of a pair of 74LS74 flip-flops 320 and 322 (FIG. 3H), thereby clearing the flip-flops.

At the time the clock signal FLIPCLOCK (FIGS. 5B and 10C) went high enabling the adders 274 and 276 (FIG. 3C) to add the Δ DC binary word to the total pulse word, the flip-flop 320 is clocked by the clock signal $\overline{ST}$ (FIG. 7I) appearing on conductor 321. The clearing of the flip-flop 320 in the manner described above determines the pulse width of the $\phi_1$ switching control signal appearing on the Q output conductor 38. At the end of a 25 usec. time period, the clock signal FLIPCLOCK will go low (FIG. 10C) enabling the adders 274 and 276 to add a negative Δ DC binary word which substracts from the total pulse-width word. At this time, the clock signal $\overline{TS}$ appearing on conductor 236 will clock the flip-flop 322 establishing the start of the $\phi_2$ control signal whose pulse width is determined by the presetting of the counters 304 and 306 (FIG. 3D).

Figure 3G:
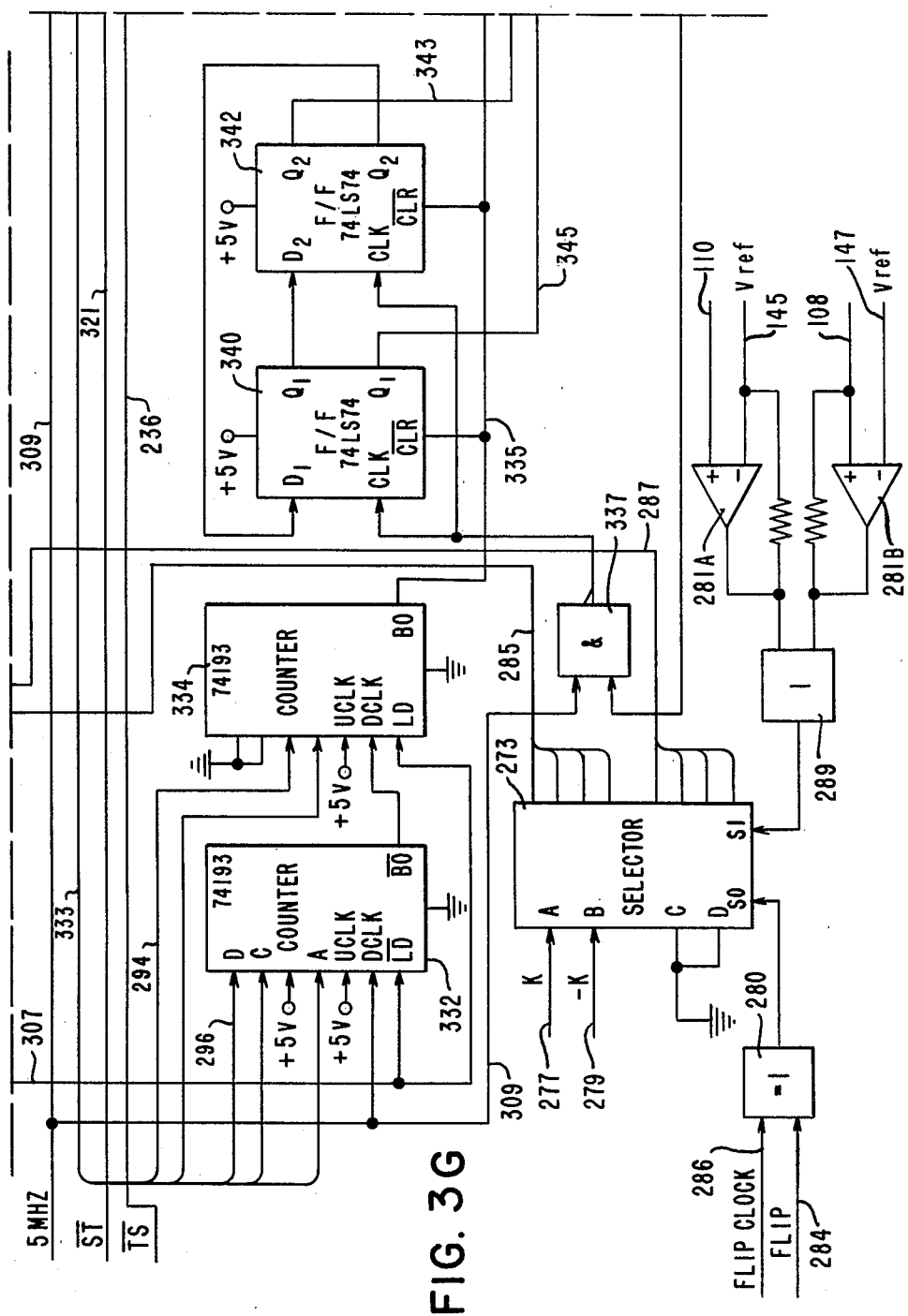

The switching control signals $\phi_1$ and $\phi_2$ are also transmitted over conductors 324 and 326 (FIG. 3H) to one input of a pair of AND gates 328 and 330 (FIG. 3H) which also receive input signals from a strobe generating circuit comprising the 74193 binary counters 332 and 334 (FIG. 3G). The counters 332 and 334 are preset by the pulse-width data appearing on the output conductor 294 and 296 from the selectors 290 and 292 (FIG. 3C) and which are transmitted over the cable 333 (FIG. 3D). The binary data is shifted one position to the right when loaded into the counters 332 and 334 which divides the inputted data by two. The counters 332 and 334 are operated to output a control signal over conductor 335 when the counters reach a count which is one half the count of the counters 304 and 306 (FIG. 3D), thereby enabling the AND gates 328 and 330 to generate a strobe pulse which goes high in the middle of the $\phi_1$ and $\phi_2$ clocking pulses. The operation of the AND gates 328 and 330 are controlled by the operation of a pair of flip-flops 340 and 342 (FIG. 3H). The flip-flops 340 and 342 are clocked by the 5 MHz. clock signals appearing on conductor 309 and are transmitted through a NAND gate 337 enabled when the flip-flops are cleared. The flip-flops 340 and 342 are cleared by the appearance of the control signal on the conductor 335 from the counter 334 with the outputs of the flip-flops 340 and 342 being gated over conductors 343 and 345 through a NAND gate 344 (FIG. 3H) and the AND gate 346. The gate 346 outputs a strobe pulse STB over conductor 348 in addition to the strobe pulses STB1 and STB2 appearing on the output conductors 350 and 352 respectively of the AND gates 328 and 330 during the time the $\phi_1$ and $\phi_2$ signals are active. The strobe signals appearing on conductors 348, 350 and 352 are used in the diagnostic circuit of the power supply. For a complete disclosure of the diagnostic operation of the power supply, reference should be made to the previously-cited Khamare et al. application, Ser. No. 242,788.

Figure 5A:
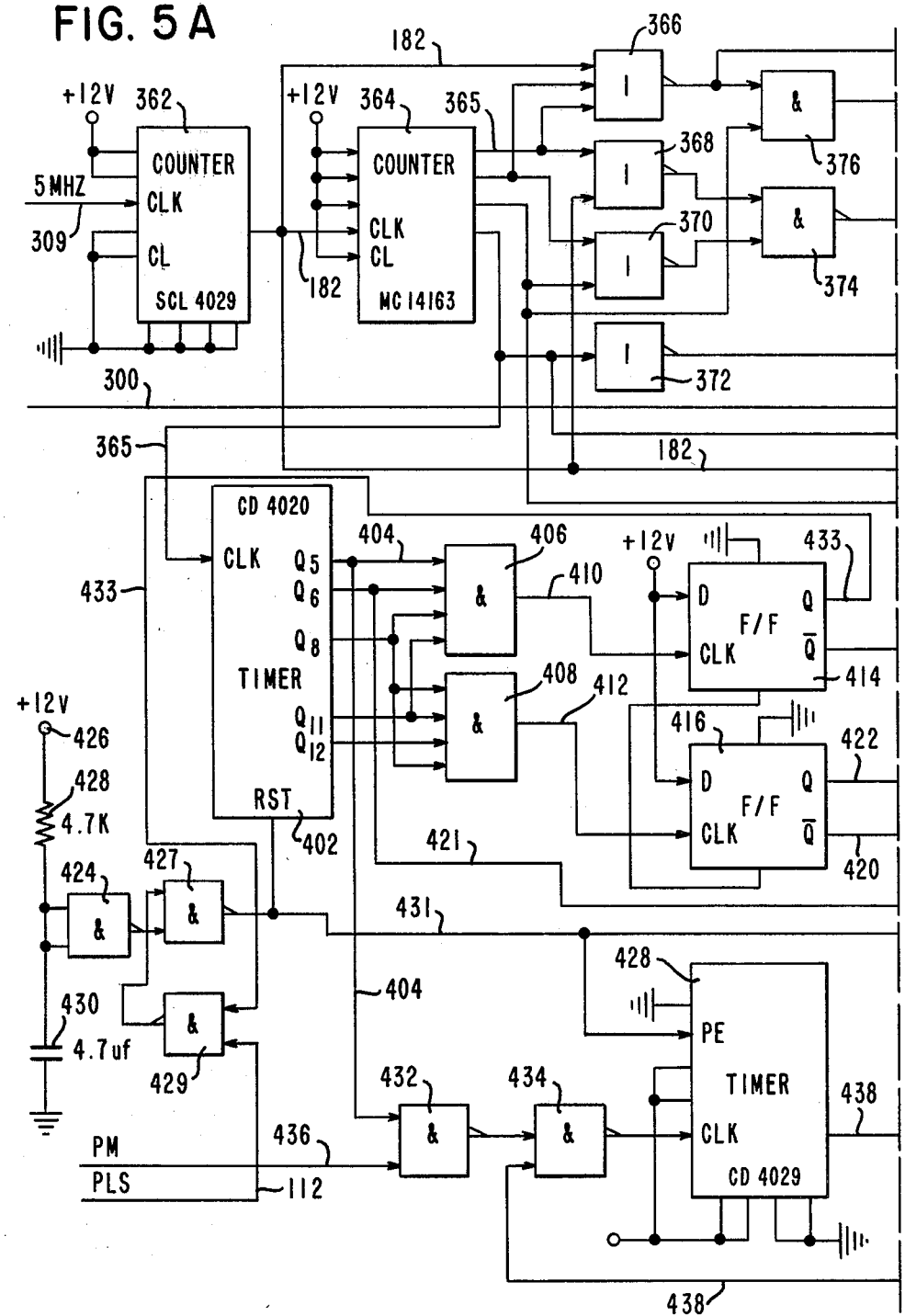

Referring now to FIGS. 5A and 5B, there is shown the timing circuit for generating the various control signals used in the operation of the power supply. As shown in FIG. 5A, a 5 MHz. clock signal generated from a 5 MHz. oscillator (not shown) is transmitted over conductor 309 into the clock input of a SCL4029 4-bit divide-by-sixteen counter 362 which divides the input clock signal by 16 to output over conductor 182 the 320 KHz. clock signals (FIG. 7A). The conductor 182 is coupled to the clock input of a second MC14163 4 bit divide-by-sixteen counter 364 which will output over its output conductor 365 the 20 KHz. clock signals (FIG. 7E) to a gate circuit which includes the NOR gates 366–370 inclusive, the NAND gates 372 and 374, the AND gate 376, together with the NOR gates 378–382 inclusive (FIG. 5B) and the NAND gates 384 and 386 which circuit outputs over conductor 387 the 4 bit block signals into a CD40257 selector 390. The selector 390 is operated by a signal FREQSEL which appears on conductor 300 and which is manually generated by the operator to select either a 20 KHz. or 40 KHz. switching frequency. The signal FREQSEL will be high if a 40 KHz. frequency is selected or low if a 20 KHz. signal is selected. The signal FREQSEL will operate the selector 390 to output over lines 391 the selected clock pulses to a plurality of level shift gates 394 which shift the level of the output signals to a voltage level enabling the CMOS circuits to operate.

Appearing on the output conductor 321 of the gates 394 is the control signal $\overline{ST}$ (FIG. 7I) which is used to clock the flip-flop 320 (FIG. 3H) to output the switching control signal $\phi_1$ (FIG. 10A). Appearing on the output conductor 236 is the clocking signal $\overline{TS}$ (FIG. 7G) used to clock the flip-flop 322 (FIG. 3H) for outputting the second switching control signal $\phi_2$ (FIG. 12B). As may be seen from an examination of FIGS. 7G and 7I, and FIGS. 10A and 10B, the switching control signals $\phi_1$ and $\phi_2$ are generated 180° out of phase with each other. Appearing on the output conductor 286 of the selector 390 is the signal FLIPCLOCK (FIG. 10C) which, as described previously, is inputted into the EXCLUSIVE OR gate 280 (FIG. 3G) for controlling the addition and the subtraction of the counts representing the ΔDC to the pulse width word during a balancing operation. Appearing on the output conductor 307 is the signal $\overline{LD}$ (FIG. 7H) which loads data into the counters 304 and 306 (FIG. 3B) enabling the switching control signals $\phi_1$ and $\phi_2$ to be outputted by the flip-flops 320 and 322 (FIG. 3H).

The 20 KHz. signal (FIG. 7E) appearing on one of the output conductors 365 of the counter 364 (FIG. 5A) will clock a CD4020 timer 402 (FIG. 5A) which will output clocking signals over its output conductors 404 to a pair of AND gates 406 and 408 whose output signals will be transmitted over conductor 410 and 412 to a pair of CD4013 D-type flip-flops 414 and 416. Appearing on the $\overline{Q}$ output conductor 418 of the flip-flop 414 will be the inhibit signal INH which, as shown in FIG. 7K will go high at the time the controller is reset by the reset signal RST (FIG. 7J) and will go low 60 ms. after the signal RST goes low. This 60 ms. delay allows the controller to condition the switching of the transistors to occur after the controller has been reset. Appearing on the Q and $\overline{Q}$ outputs of the flip-flop 416 will be the power up signals PWRUP appearing on conductor 420 and the inverted power up signal $\overline{PWRUP}$ appearing on conductor 422. After 100 ms. has elapsed, the output count of the timer 402 which appears on the input of the AND gate 408 enables the gate to output a clocking pulse to the flip-flop 416 resulting in the signal $\overline{PWRUP}$ going high. The signals $\overline{PWRUP}$ going high notify the controller 90 (FIG. 1A) that the power supply has failed to reach 90% of its normal output within the 100 ms. time period. In response to this signal, the controller will shut down the power up operation.

Also included in the timing circuit of FIGS. 5A and 5B is a reset circuit which includes a NAND gate 424 powered by a 12 volt power supply 426 tied to ground through a 4.7K resistor 428 and a 4.7 uF capacitor 430. Further included in the reset circuit is the NAND gate 427 which receives the output signal from gate 424 and the output signal from a second NAND gate 429. The NAND gate 429 receives the power loss sense signal PLS appearing on conductor 112 (FIG. 1A) and the Q output of the flip-flop 414 over conductor 433. The signal PLS (FIG. 8) will go high when the bulk voltage appearing on the output of the bridge rectifier 24 (FIG. 1A) reaches 78% of a reference voltage enabling the NAND gates 427 and 429 to output over conductor 431 the signal RST to reset various circuits in the controller. Also included in the timing circuit is a CD4029 timer 428 (FIG. 5A) which is clocked by a clock signal appearing on the output line 404 from the timer 402 and which is transmitted through the NAND gates 432 and 434. The timer 428 will output the control signal REG (FIG. 7N) which initiates a power-up sequence and which occurs 20 ms. after the control signal PM (FIGS. 7M and 8) appearing on the input conductor 436 to the NAND gate 432 goes high. The control signal PM goes high when the power supply has reaches 90% of its normal value within 100 ms. of the time the power supply started its switching operation. Otherwise it indicates an unsuccessful attempt to provide a power-up operation. Once the signal PM goes high, a soft start operation is initiated for another 20 ms. after which the timer 428 will output a low signal over conductor 438 which is inverted by the NAND gate 440 (FIG. 5B) to provide the signal REG on conductor 442.

Further included in the timing circuit is a CD4029 binary counter 425 (FIG. 5B) which is clocked by a signal appearing on the conductor 421 and transmitted from the output line 404 of the timer 402 (FIG. 5A). The counter 425 will generate over the output conductors 211 a plurality of consecutively higher binary numbers, each comprising a value representing a percentage of the duty cycle of the power supply and which is used, when inputted into the selectors 216 (FIG. 3B) and 218 (FIG. 3F), as the upper limit of the pulse width of the switching control signals $\phi_1$ and $\phi_2$ during a soft-start operation. For a complete disclosure of a soft-start operation, reference should be made to the previously cited Bruckner et al. application.

Figure 8:
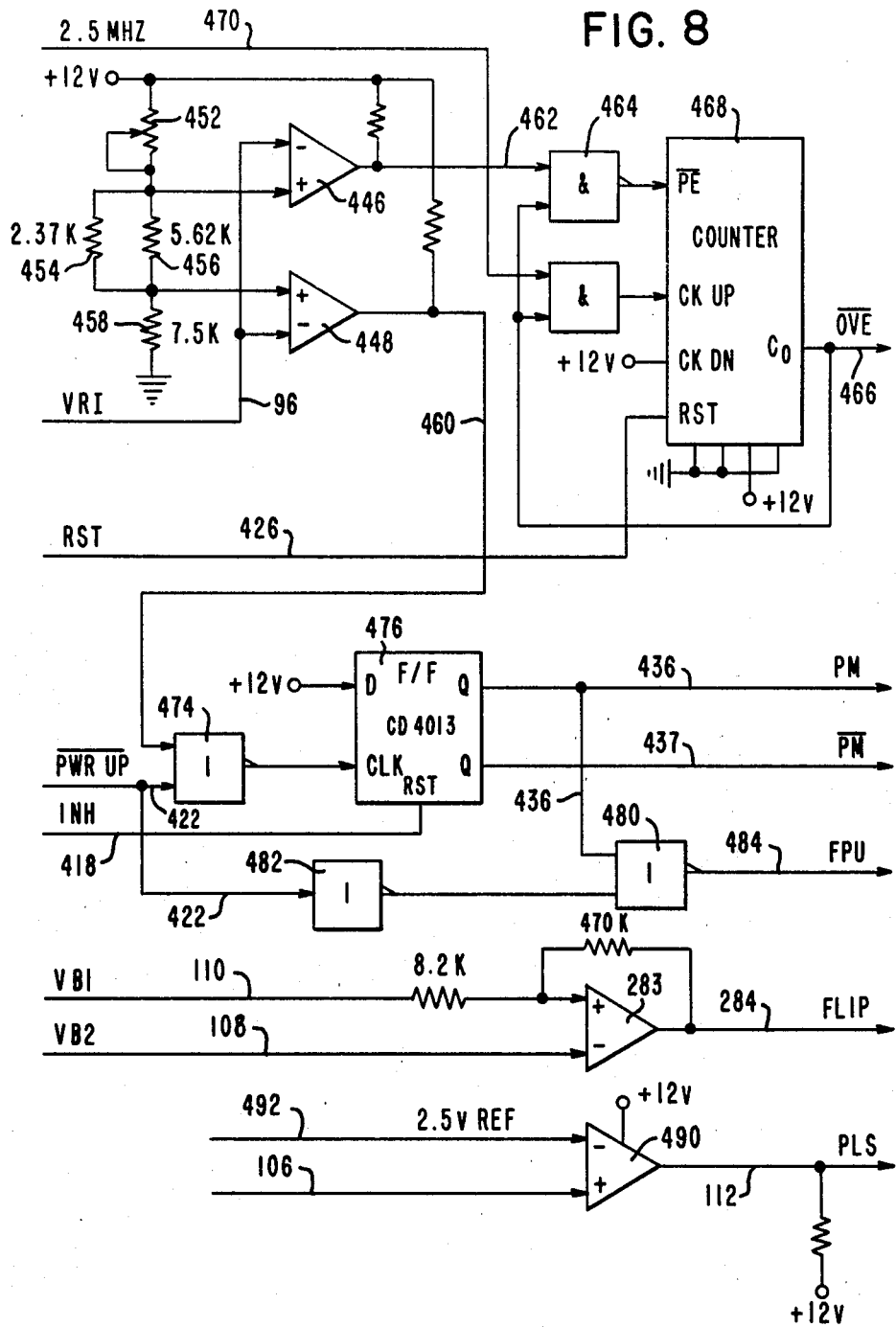
FIG. 8 discloses the logic circuit for generating control signals used in controlling the magnetizing current in the transformer.

Referring now to FIG. 8 of the drawing, there is shown the logic circuits for detecting the occurrence of an overvoltage and overcurrent condition of the power supply together with the circuits for generating the control signals FLIP and PLS. Included in the circuit are a pair of LM139 operational amplifiers 446 and 448 which compare the voltage output of the power supply represented by the signal $V_{R1}$ appearing on the output conductor 96 (FIG. 1A) of the signal conditioner 88 with a reference voltage. This binary signal $V_{R1}$ is inputted into the inverting (−) input of the amplifiers 446 and 448 which receives at their non-inverting inputs (+) a reference voltage level representing the threshold voltage level which determines an overvoltage or undervoltage condition. A 12 volt power supply 450 supplies voltage to a 2K pot resister 452 which in turn supplies a reference voltage pulse to the amplifier 446 the level of which is 112%–125% of the normal value of the power output circuit 52 which in the present example if 5 V. A voltage drop network comprising resistor 454–458 inclusive provides a reference voltage to the amplifier 448 which will output a high signal over conductor 460 when an undervoltage condition exists. If an overvoltage condition exists, the amplifier 446 will output over conductor 462 a low signal to one input of a NAND gate 464 whose other input receives a high signal appearing on the output conductor 466 of an overvoltage fault flag generator comprising a CD40192 counter 468. The NAND gate 464 when receiving the low signal over conductor 462 will output a high signal to the timer 468 which outputs the overvoltage signal OVF over conductor 466 after a 2 us. delay. The signal OVF will remain high until the counter is reset by the signal RST appearing on the conductor 426. The counter 468 is clocked by 2.5 MHz. clock signals appearing on conductor 470 and which are transmitted through the AND gate 472 enabled by the high signal appearing on the conductor 466. The high signal appearing on the output conductor of the amplifier 446 is also outputted into one input of a NAND gate 474 which receives over conductor 422 the low signal PWRUP (FIG. 5B) enabling the NAND gate 474 to clock a CD4013 D-type flip-flop 476 which outputs over the Q output conductor 436 the signal PM (FIG. 7L). As previously described, the signal PM enables the timer 428 (FIG. 5A) to output the signal REG (FIG. 7M) after a 20 ms. delay.

The signal PM appearing on the output conductor 436 is also inputted into a NOR gate 480 which receives the inverted PWRUP signal transmitted over conductor 422 to the inverter 482 and which is high when the level of the power supply has not reached 90% of its rated output within 100 ms. after the start of a power up sequence. The NOR gate 480 will output the high signal FPU over conductor 484 indicating the condition that the power output of the circuit 52 (FIG. 1B) has not reached its rated output. In response to the generation of this signal, the controller 90 will shut down the system.

Also disclosed in FIG. 8 is the circuit for the generation of the signal FLIP used in the balancing circuit shown in FIG. 3G and the signal PLS used in resetting the controller after the bulk voltage level has reached 78% of the normal output of the power supply. Included in the circuit is an LM139 operational amplifier 283 acting as a voltage comparator and which receives over its input conductors 108 and 110 (FIG. 1A) the balancing signals VB1 (FIG. 9C) and VB2 (FIG. 9D) for controlling the output signal FLIP in the manner described previously. An operational amplifier 490 receives over conductor 492 a 2.5 V reference voltage and the level of the bulk voltage at the output of the bridge rectifier 24 (FIG. 1A). This signal appears on conductor 106 (FIG. 1A). The amplifier 490 will output the high signal PLS over conductor 112 when the bulk voltage reaches 78% of the normal output. As described previously, this signal enables the gates 427 and 429 (FIG. 5A) to reset the controller 90 wherein the controller will initiate a power up sequence.

The IC circuits disclosed in this application are commercially available from the following manufacturers. Those circuits having the prefix MC are available from the Motorola Corporation of Phoenix, Ariz.; the prefix CD from RCA Corporation of New York, N.Y.; the prefix MP from Analog Devices of Santa Clara, Calif. and the prefix LM from National Semiconductor Corporation of Santa Clara, Calif.

While the principles of the invention have now been made clear in the illustrated embodiment, it will be obvious to those skilled in the art that many modifications in structure, arrangement, elements and components can be made which are particularly adapted for specific environments and operation requirements without departing from these principles. The appended claims are therefore intended to cover and embrace any such modification, within the limits only of the true spirit and scope of the invention.

I claim:

1. In a power supply comprising an input circuit, an output circuit, first and second switching means driving opposite sides of the input windings of an output transformer when enabled, means for generating pulse-width modulated control signals for enabling said switching means comprising:
   first means for generating a first digital value representing the change in level of the output circuit;
   means for sensing the output level of said first and second switching means;
   second means for generating first and second control signals upon the output level of said first and second switching means reaching a first threshold level;
   adding means connected to said first generating means for receiving said first digital values;
   logic means connected to said adding means to output a second digital value in response to the generation of said first and second control signal enabling said adding means to add said first and second digital values to produce a third digital value;
   and means connected to said adding means for converting the third digital value to a pulse-width modulated control signal for changing the output level of said first and second switching means.

2. The power supply of claim 1 in which said logic means includes selecting means receiving said second digital values, said selecting means connected to said second generating means and enabled upon the generation of said first and second control signals to output said second digital values whereby the adding means will output the third digital value enabling the output level of the switching means to be reversed.

3. The power supply of claim 2 in which said sensing means includes:
   current sensing means for sensing the current level in the primary winding of said transformer;
   means for converting the current level into error signals;
   and said second generating means includes comparator means for receiving said error signals and outputting said first and second control signals to said selecting means upon said error signals reaching a first threshold.

4. The power supply of claim 3 in which said power supply includes a source of clock signals and said logic means further includes gate means receiving said clock signal and said first control signal for outputting a third control signal enabling said selecting means to output said second digital value.

5. The power supply of claim 4 in which said gate means comprises an Exclusive OR logic circuit.

6. The power supply of claim 3 in which said selecting means receives a fourth digital value and said gate means is enabled by said clock pulses to output a fourth control signal to said selecting means whereby the selecting means will output said fourth digital value to the adding means enabling the adding means to subtract the fourth digital value from the first digital value.

7. In a power supply comprising an input circuit, an output circuit, first and second switching means driving opposite sides of the input windings of an output transformer when enabled, means for generating pulse-width modulated control signals for enabling said switching means comprising:
   first means for generating a first digital value repesenting the change in the power level of the output circuit;
   means for sensing the output level of said first and second transistor switching means;

second means for generating a plurality of first selecting signals upon said output level reaching a first threshold value and a plurality of second selecting signals upon said output level reaching a second threshold value;

adding means connected to said first generating means for receiving said first digital values;

selecting means connected to said adding means and said second generating means, said selecting means receiving second and third digital values and enabled by said first selecting signals to output said second digital values and by said second selecting signals to output said third digital values allowing said adding means to add the inputted digital values to produce a fourth digital value;

logic circuit means connected to said selecting means and receiving said first and second selecting signals to output third selecting signals to said selecting means in accordance with the first and second selecting signals received;

and means connected to said adding means for converting said fourth digital value to a pulsewidth modulated control signal changing the output level of said first and second switching means.

8. The power supply of claim 7 in which said sensing means includes:

current sensing means for sensing the current level in the primary windings of the transformer;

means for converting the current level into first and second sensing signals corresponding to the power level produced by the operation of said switching means;

and said second generating means includes a plurality of comparator members receiving said first and second sensing signals for comparing said sensing signals, said comparator members constructed to output said first selecting signals upon the difference between the sensing signals reaching a first threshold value and the second selecting signals upon reaching a second threshold value.

9. The power supply of claim 8 in which said logic circuit means includes first and second gate means connected to said selecting means, and said comparator means includes a first comparator member connected to said first gate means and second and third comparator members connected to said second gate means, said selecting means enabled by the first or second selecting signals outputted by the comparator members to output said second and third digital values in accordance with the threshold value reached by said sensing signals.

10. The power supply of claim 9 which further includes a source of clock pulses connected to said first gate means and enabling said first gate means to output first and second control signals to said selecting member whereby the selecting member will output said second digital values enabling the adding means to add the second digital value to the first digital value upon receiving said first control signal and outputs said third digital value upon receiving said second control signal enabling the adding means to subtract the third digital value from the first digital value.

11. The power supply of claim 10 in which said second and third digital values will reverse the output level of said first and second switching means.

12. The power supply of claim 11 in which said third digital value will reverse the output level of said first and second switching means in a direction opposite to that of said second digital value.

13. The power supply of claim 10 in which said first gate means comprises an Exclusive OR logic circuit.

14. The power supply of claim 10 in which said selecting means receives a fifth digital value, said comparator members further constructed to output third selecting signals during the time the output level of said switching means has not reached either of said first and second threshold levels, said third selecting signal being transmitted to said gate means enabling the gate means to output third control signals to the selecting means whereby the selecting means will output said fifth digital signals to the adding means allowing the adding means to output said first digital signal.

15. The power supply of claim 12 in which said second and third digital values represent 50% of the saturation value of the transformer.

* * * * *